United States Patent
Warzelhan et al.

(10) Patent No.: US 6,353,084 B1
(45) Date of Patent: *Mar. 5, 2002

(54) BIODEGRADABLE POLYESTRERAMIDE AND A PROCESS OF PREPARING

(75) Inventors: Volker Warzelhan, Weisenheim; Gunnar Schornick, Neuleiningen; Edwin Baumann, Schifferstadt; Ursula Seeliger, Ludwigshafen; Motonori Yamamoto, Mannheim; Gerhard Ramlow, Weinheim, all of (DE)

(73) Assignee: BASF Aktiengesellschaft, Ludwigshafen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/860,755
(22) PCT Filed: Jun. 27, 1995
(86) PCT No.: PCT/EP95/02493
§ 371 Date: Jul. 7, 1997
§ 102(e) Date: Jul. 7, 1997
(87) PCT Pub. No.: WO96/21689
PCT Pub. Date: Jul. 18, 1996

(30) Foreign Application Priority Data

Jan. 13, 1995 (DE) .......... 195 00 757

(51) Int. Cl.$^7$ .......... C08G 69/44; C08G 18/60; C08L 77/12
(52) U.S. Cl. .......... 528/310; 528/170; 528/172; 528/173; 528/272; 528/289; 528/332; 528/335; 528/336; 525/427; 525/432; 525/436
(58) Field of Search .......... 528/332, 310, 528/170, 172, 173, 272, 289, 335, 336; 525/427, 432, 436

(56) References Cited

U.S. PATENT DOCUMENTS

| 3,803,259 A | 4/1974 | Porchey et al. |
| 4,328,049 A | 5/1982 | Richardson .......... 148/9 |
| 4,328,059 A | 5/1982 | Horlbeck et al. .......... 156/332 |
| 5,661,193 A | 8/1997 | Khemani et al. .......... 521/182 |
| 5,863,991 A | 1/1999 | Warzelhan et al. .......... 525/426 |
| 5,880,220 A | 3/1999 | Warzelhan et al. .......... 525/424 |

FOREIGN PATENT DOCUMENTS

| EP | 7 445 | 2/1980 |
| EP | 13 461 | 7/1980 |
| EP | 21 042 | 1/1981 |
| EP | 28 687 | 5/1981 |
| EP | 372 846 | 6/1990 |
| EP | 515 203 | 11/1992 |
| EP | 534 295 | 3/1993 |
| EP | 565 235 | 10/1993 |
| GB | 818 157 | 8/1959 |
| GB | 1115512 | 5/1965 |
| GB | 1010916 | 11/1965 |
| GB | 1164331 | 9/1969 |
| JP | 60/147430 | 8/1985 |
| WO | 90/05161 | 5/1990 |
| WO | 92/00441 | 1/1992 |
| WO | 92/13019 | 8/1992 |

OTHER PUBLICATIONS

Handbook of Polymeric foams . . . , Shutov, 375–408, 1991, The Month of Publication in the Date is not Available.

Adhesive Comp., P. 547–577, Encycl. of Polym. Sci. and Eng., vol. 1, The Month of Publication in the Date is not Available.

Kunststoff–Handbuch, Bd. 3/1, p. 24–28, 1992.

J. of Appl. Polym. Sci., vol. 32, p. 6191–6207, 1986, The Month of Publication in the Date is not Available.

(List continued on next page.)

Primary Examiner—P. Hampton-Hightower
(74) Attorney, Agent, or Firm—Keil & Weinkauf

(57) ABSTRACT

Biodegradable polyesteramides as defined in the specification are obtained by reacting a mixture consisting essentially of $a_1$) a mixture consisting essentially of
  35 to 95 mol % of adipic acid or ester-forming derivatives thereof,
  5 to 65 mol % of terephthalic acid or ester-forming derivatives thereof, and
  0 to 5 mol % of a compound containing sulfonate groups, $a_2$) a mixture consisting essentially of
  95.5 to 0.5 mol % of a dihydroxy compound,
  0.5 to 99.5 mol % of an amino-$C_2$–$C_{12}$-alkanol or an amino-$C_5$–$C_{10}$-cycloalkanol,
  0 to 50 mol % of a diamino-$C_1$–$C_8$-alkane, and
  0 to 50 mol % of a 2,2'-bisoxazoline of the formula I

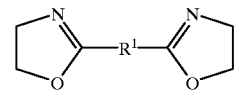

wherein $R^1$ is as set forth in the specification, and $a_3$) 0 to 5 mol %, based on $a_1$), of a compound D as set forth in the specification;

and other biodegradable polymers and thermoplastic molding compositions, their manufacture and their use for producing biodegradable moldings, adhesives, foams, and coatings.

61 Claims, No Drawings

OTHER PUBLICATIONS

Roempp Chem. Lexikon, Bd. 6, Ny, 9. Aufl., p. 4626–4633 and 5136–5143, 1992, The Month of Publication in the Date is not Available.
Sax Toxic Sub. Data Book, Fujiyama et al., p. 360, The Month of Publication in the Date is not Available.
B Fortunato et al., Poly, vol. 35, Nr. 18, p. 4006–4010, 1994, The Month of Publication in the Date is not Available.
Enc of Poly. Sci and Eng., Bd. 12, 2nd Ed., p. 1–75, 1988.
Kunststoff–Handbuch, Bd. 3/1, p. 15–23, 1992, Muenchen.
Agnew. Chem. int. Edit., vol. 11, p. 287–288, 1972.
Sorensen+Campbell, Prep. Methods of poly. Chem., Interscience Pub., p. 111–127, 1961.
J. Biochem. vol. 59, p. 537, 1966, The Month of Publication in the Date is not Available.
Plant Cell Physiol., vol. 7, s. 93, 1966, The Month of Publication in the Date is not Available.
Agric. Biol. Chem., vol. 39, p. 1219, 1975.
J. of Apll. Poly. Sci., Bd. 24, p. 1701–1711, 1979.
J. of Appl. Poly. Sci., Bd., 26, p. 441–448, 1981.
Y. Tokiwa et al., Nature, Bd. 270, p. 76–78, 1977, The Month of Publication in the Date is not Available.

BIODEGRADABLE POLYESTRERAMIDE AND A PROCESS OF PREPARING

BACKGROUND OF THE INVENTION

This is a National Stage Application under 35 U.S.C. 371, based on International Application No. PCT/EP 95/02,493, filed Jun. 27, 1995.

1. Field of the Invention

The present invention relates to biodegradable polyesteramides P1 obtainable by reacting a mixture consisting essentially of (a1) a mixture consisting essentially of
  35–95 mol % of adipic acid or ester-forming derivatives thereof or mixtures thereof,
  5–65 mol % of terephthalic acid or ester-forming derivatives thereof or mixtures thereof, and
  0–5 mol % of a compound containing sulfonate groups, where the total of the individual mole percentages is 100 mol %, and
(a2) a mixture consisting essentially of
  (a21) 99.5–0.5 mol % of a dihydroxy compound selected from the group consisting of $C_2$–$C_6$-alkanediols and $C_5$–$C_{10}$-cycloalkanediols,
  (a22) 0.5–99.5 mol % of an amino-$C_2$–$C_{12}$-alkanol or an amino-$C_5$–$C_{10}$-cycloalkanol, and
  (a23) 15 50 mol % of a diamino-$C_1$–$C_8$-alkane,
  (a24) 0–50 mol % of a 2,2'-bisoxazoline of the general formula

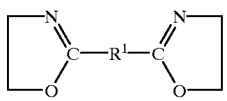

I where $R^1$ is a single bond, a $(CH_2)_q$ alkylene group with q=2, 3 or 4, or a phenylene group, where the total of the individual mole percentages is 100 mol %, and where the molar ratio of (a1) to (a2) is chosen in the range from 0.4:1 to 1.5:1,
with the proviso that the polyesteramides P1 have a molecular weight ($M_n$) in the range from 4000 to 40,000 g/mol, a viscosity number in the range from 30 to 350 g/ml (measured in o-dichlorobenzene/phenol (50/50 ratio by weight) at a concentration of 0.5% by weight of polyesteramide P1 at 25° C.) and a melting point in the range from 50 to 220° C., and with the further proviso that from 0 to 5 mol %, based on the molar amount of component (a1) used, of a compound D with at least three groups capable of ester formation are used to prepare the polyesteramides P1.

The invention furthermore relates to polymers and biodegradable thermoplastic molding compositions as claimed in the dependent claims, processes for the preparation thereof, the use thereof for producing biodegradable moldings, and adhesives, biodegradable moldings, foams and blends with starch obtainable from the polymers and molding compositions according to the invention.

2. Description of the Related Art

Polymers which are biodegradable, ie. decompose under environmental influences in an appropriate and demonstrable time span have been known for some time. This degradation usually takes place by hydrolysis and/or oxidation, but predominantly by the action of microorganisms such as bacteria, yeasts, fungi and algae. Y. Tokiwa and T. Suzuki (Nature, 270 (1977) 76–78) describe the enzymatic degradation of aliphatic polyesters, for example including polyesters based on succinic acid and aliphatic diols.

EP-A 565,235 describes aliphatic copolyesters containing [—NH—C(O)O—] groups (urethane units). The copolyesters of EP-A 565,235 are obtained by reacting a prepolyester, which is obtained by reacting essentially succinic acid and an aliphatic diol, with a diisocyanate, preferably hexamethylene diisocyanate. The reaction with the diisocyanate is necessary according to EP-A 565,235 because the polycondensation alone results only in polymers with molecular weights such that they display unsatisfactory mechanical properties. A crucial disadvantage is the use of succinic acid or ester derivatives thereof to prepare the copolyesters because succinic acid and derivatives thereof are costly and are not available in adequate quantity on the market. In addition, the polyesters prepared using succinic acid as the only acid component are degraded only extremely slowly.

WO 92/13019 discloses copolyesters based predominantly on aromatic dicarboxylic acids and aliphatic diols, where at least 85 mol % of the polyesteramide diol residue comprise a terephthalic acid residue. The hydrophilicity of the copolyester is increased and the crystallinity is reduced by modifications such as the incorporation of up to 2.5 mol % of metal salts of 5-sulfoisophthalic acid or short-chain ether diol segments such as diethylene glycol. This is said in WO 92/13019 to make the copolyesters biodegradable. However, a disadvantage of these copolyesters is that the biodegradation by microorganisms was not demonstrated, on the contrary only the behavior towards hydrolysis in boiling water or, in some cases, also with water at 60° C.

According to the statements of Y. Tokiwa and T. Suzuki (Nature, 270 (1977) 76–78 or J. of Appl. Polymer Science, 26 (1981) 441–448), it may be assumed that polyesters which are essentially composed of aromatic dicarboxylic acid units and aliphatic diols, such as PET (polyethylene terephthalate) and PBT (polybutylene terephthalate), are not enzymatically degradable. This also applies to copolyesters which contain blocks composed of aromatic dicarboxylic acid units and aliphatic diols.

Furthermore, Y. Tokiwa, T. Suzuki and T. Ando (J. of Appl. Polym. Sci. 24 (1979) 1701–1711) prepared polyesteramides and blends of poly-caprolactone and various aliphatic polyamides such as polyamide-6, polyamide-66, polyamide-11, polyamide-12 and polyamide-69 by melt condensation and investigated their biodegradability by lipases. It was found that the biodegradability of such polyesteramides depends greatly on whether there is a predominantly random distribution of the amide segments or, for example, a block structure. In general, amide segments tend to reduce the rate of biodegradation by lipases.

However, the crucial factor is that no lengthy amide blocks are present, because it is known from Plant. Cell Physiol. 7 (1966) 93, J. Biochem. 59 (1966) 537 and Agric. Biol. Chem. 39 (1975) 1219 that the usual aliphatic and aromatic polyamides are biodegradable at the most only when oligomers, otherwise not.

Witt et al. (handout for a poster at the International Workshop of the Royal Institute of Technology, Stockholm, Sweden, Apr. 21–23, 1994) describe biodegradable copolyesters based on 1,3-propanediol, terephthalic ester and adipic or sebacic acid. A disadvantage of these copolyesters is that moldings produced therefrom, especially sheets, have inadequate mechanical properties.

BRIEF SUMMARY OF THE INVENTION

It is an object of the present invention to provide polymers which are degradable biologically, ie. by microorganisms, and which do not have these disadvantages. The intention was, in particular, that the polymers according to the invention be preparable from known and low-cost monomer units and be insoluble in water. It was furthermore the intention that it be possible to obtain products tailored for the desired uses according to the invention by specific modifications such as chain extension, incorporation of hydrophilic groups and groups having a branching action. The aim was moreover that the biodegradation by microorganisms should not be achieved at the expense of the mechanical properties in order not to restrict the number of applications.

We have found that this object is achieved by the polymers and thermoplastic molding compositions defined at the outset.

We have furthermore found processes for the preparation thereof, the use thereof for producing biodegradable moldings and adhesives, and biodegradable moldings, foams, blends with starch and adhesives obtainable from the polymers and molding compositions according to the invention.

DETAILED DESCRIPTION OF THE INVENTION

The polyesteramides P1 according to the invention have a molecular weight ($M_n$) in the range from 4000 to 40,000, preferably from 5000 to 35,000, particularly preferably from 6000 to 30,000, g/mol, a viscosity number in the range from 30 to 350, preferably from 50 to 300, g/ml (measured in o-dichlorobenzene/phenol (50/50 ratio by weight) at a concentration of 0.5% by weight of polyesteramide P1 at 25° C.) and a melting point in the range from 50 to 220, preferably from 60 to 220° C.

The polyesteramides P1 are obtained according to the invention by reacting a mixture consisting essentially of (a1) a mixture consisting essentially of
- 35–95, preferably from 45 to 80, mol % of adipic acid or ester-forming derivatives thereof, in particular the di-$C_1$–$C_6$-alkyl esters such as dimethyl, diethyl, dipropyl, dibutyl, dipentyl and dihexyl adipate, or mixtures thereof, preferably adipic acid and dimethyl adipate, or mixtures thereof,
- 5–65, preferably 20–55, mol % of terephthalic acid or ester forming derivatives thereof, in particular the di-$C_1$–$C_6$-alkyl esters such as dimethyl, diethyl, dipropyl, dibutyl, dipentyl or dihexyl terephthalate, or mixtures thereof, preferably terephthalic acid and dimethyl terephthalate, or mixtures thereof, and
- 0–5, preferably from 0 to 3, particularly preferably from 0.1 to 2, mol % of a compound containing sulfonate groups, where the total of the individual mole percentages is 100 mol %, and (a2) a mixture consisting essentially of
- (a21) 99.5–0.5, preferably 99.5–50, particularly preferably 98.0–70, mol % of a dihydroxy compound selected from the group consisting of $C_2$–$C_6$-alkanediols and $C_5$–$C_{10}$-cycloalkanediols,
- (a22) 0.5–99.5, preferably 0.5–50, particularly preferably 1–30, mol % of an amino-$C_2$–$C_{12}$-alkanol or of an amino-$C_5$–$C_{10}$-cycloalkanol, and
- (a23) 0–50, preferably from 0 to 35, particularly preferably from 0.5 to 30, mol % of a diamino-$C_1$–$C_8$-alkane,
- (a24) 0–50, preferably 0–30, particularly preferably 0.5–20, mol % of a 2,2'-bisoxazoline of the general formula I

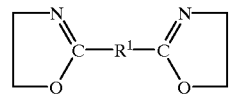

where $R^1$ is a single bond, an ethylene, n-propylene or n-butylene group, or a phenylene group, and $R^1$ is particularly preferably n-butylene, where the total of the individual mole percentages is 100 mol %, where the molar ratio of (a1) to (a2) is chosen in the range from 0.4:1 to 1.5:1, preferably from 0.6:1 to 1.1:1.

The compound containing sulfonate groups which is normally employed is an alkali metal or an alkaline earth metal salt of a dicarboxylic acid containing sulfonate groups, or the ester-forming derivatives thereof, preferably alkali metal salts of 5-sulfoisophthalic acid or mixtures thereof, particularly preferably the sodium salt.

The dihydroxy compounds (a21) employed according to the invention are selected from the group consisting of $C_2$–$C_6$-alkanediols, $C_5$–$C_{10}$-cycloalkanediols, the latter also including 1,2-cyclohexanedimethanol and 1,4-cyclohexanedimethanol, such as ethylene glycol, 1,2- and 1,3-propanediol, 1,2- and 1,4-butanediol, 1,5-pentanediol or 1,6-hexanediol, in particular ethylene glycol, 1,3-propanediol and 1,4-butanediol, cyclopentanediol, 1,4-cyclohexanediol and mixtures thereof.

The amino-$C_2$–$C_2$-alkanol or amino-$C_5$–$C_{10}$-cycloalkanol (component (a22)), this being intended also to include 4-aminomethylcyclohexanemethanol, which is preferably employed is an amino-$C_2$–$C_6$-alkanol such as 2-aminoethanol, 3-aminopropanol, 4-aminobutanol, 5-aminopentanol, 6-aminohexanol and amino-$C_5$–$C_6$-cycloalkanols such as aminocyclopentanol and aminocyclohexanol, or mixtures thereof.

The diamino-$C_1$–$C_8$-alkane which is preferably employed is a diamino-$C_4$–$C_6$-alkane such as 1,4-diaminobutane, 1,5-diaminopentane and 1,6-diaminohexane (hexamethylenediamine, HMD).

The compounds of the general formula I (component a24) are, as a rule, obtainable by the process of Angew. Chem. int. Edit. 11 (1972) 287–288.

From 0 to 5, preferably from 0.01 to 4 mol %, based on component (a1), of at least one compound D with at least three groups capable of ester formation are used according to the invention.

The compounds D preferably contain three to ten functional groups capable of forming ester linkages. Particularly preferred compounds D have three to six functional groups of this type in the molecule, in particular three to six hydroxyl groups and/or carboxyl groups. Examples which may be mentioned are:

tartaric acid, citric acid, malic acid;
trimethylolpropane, trimethylolethane;
pentaerythritol;
polyethertriols;
glycerol;
trimesic acid;
trimellitic acid or anhydride;
pyromellitic acid or dianhydride and
hydroxyisophthalic acid.

When compounds D which have a boiling point below 200° C. are used in the preparation of the polyester amides P1, a proportion may distil out of the polycondensation mixture before the reaction.

It is therefore preferred to add these compounds in an early stage of the process, such as the transesterification or esterification stage, in order to avoid this complication and in order to achieve the maximum possible uniformity of their distribution within the polycondensate.

In the case of compounds D which boil above 200° C., they can also be employed in a later stage of the process. By adding the compound D it is possible, for example, to alter the melt viscosity in a desired manner, to increase the impact strength and to reduce the crystallinity of the polymers or molding compositions according to the invention.

The preparation of the biodegradable polyesteramides P1 is known in principle (Sorensen and Campbell, Preparative Methods of Polymer Chemistry, Interscience Publishers, Inc., New York, 1961, pages 111–127; Kunststoff-Handbuch, Volume 3/1, Carl Hanser Verlag, Munich, 1992, pages 15–23) (preparation of polyesteramides); WO 92/13019; EP-A 568,593; EP-A 565,235; EP-A 28,687 (preparation of polyesters); Encycl. of Polym. Science and Eng. Vol. 12, 2nd ed., John Wiley & Sons, 1988,pages 1–75, in particular pages 59 and 60; GB 818,157; GB 1,010,916; GB 1,115,512), so that details on this are superfluous.

Thus, for example, the reaction of dimethyl esters of component a1 with component a2 can be carried out at from 160 to 230° C. in the melt under atmospheric pressure, advantageously under an inert gas atmosphere.

In a preferred embodiment, first the required amino hydroxy compound (a22) is reacted with component (a1), preferably terephthalic acid, dimethyl terephthalate, adipic acid, di-$C_2$–$C_6$-alkyl adipate, succinic anhydride, phthalic anhydride, in a molar ratio of 2:1.

In another preferred embodiment, the required diamine compound (a23) is reacted with component (a1), preferably terephthalic acid, dimethyl terephthalate, adipic acid, di-$C_2$–$C_6$-alkyl adipate, succinic anhydride, phthalic anhydride, in a molar ratio of at least 0.5:1, preferably 0.5:1.

In another preferred embodiment, the required bisoxazoline (a24) is reacted with component (a1), preferably terephthalic acid, dimethyl terephthalate, acipic acid, di-$C_2$–$C_4$-alkyl adipate, succinic anhydride, phthalic anhydride, in a molar ratio of at least 0.5:1, preferably 0.5:1.

In the case of a mixture of at least one amino hydroxy compound (a22) and at least one diamino compound (a23) and at least one 2,2'-bisoxazoline (a24), these are expediently reacted with component (a1) in the molar amounts stated in the abovementioned preferred embodiments.

In the preparation of the biodegradable polyesteramide P1, it is advantageous to use a molar excess of component (a2) relative to component (a1), for example up to 2½ times, preferably up to 1.67 times.

The biodegradable polyesteramide P1 is normally prepared with the addition of suitable conventional catalysts (Encycl. of Polym. Science and Eng., Vol. 12, 2nd ed., John Wiley & Sons, 1988, pages 1–75, in particular pages 59 and 60; GB 818,157;GB 1,010,916; GB 1,115,512), for example metal compounds based on the following elements such as Ti, Ge, Zn, Fe, Mn, Co, Zr, V, Ir, La, Ce, Li and Ca, preferably organometallic compounds based on these metals, such as salts of organic acids, alkoxides, acetyacetonates and the like, particularly preferably based on lithium, zinc, tin and titanium.

When dicarboxylic acids or anhydrides thereof are used as component (a1), esterification thereof with component (a2) can take place before, at the same time as or after the transesterification. In a preferred embodiment, the process described in DE-A 23 26 026 for preparing modified polyalkylene terephthalates is used.

After the reaction of components (a1) and (a2), the polycondensation is carried out as far as the desired molecular weight, as a rule under reduced pressure or in a stream of inert gas, for example of nitrogen, with further heating to from 180 to 260° C.

In order to prevent unwanted degradation and/or side reactions, it is also possible in this stage of the process if required to add stabilizers. Examples of such stabilizers are the phosphorus compounds described in EP-A 13 461, U.S. Pat. No. 4,328,049 or in B. Fortunato et al., Polymer Vol. 35, No. 18, pages 4006–4010, 1994, Butterworth-Heinemann Ltd. These may also in some cases act as inactivators of the catalysts described above. Examples which may be mentioned are: organophosphites, phosphonous acid and phosphorous acid, and the alkali metal salts of these acids. Examples of compounds which act only as stabilizers are: trialkyl phosphites, triphenyl phosphite, trialkyl phosphates, triphenyl phosphate and tocopherol (vitamin E) (obtainable as Uvinul$^R$ 2003A0 (BASF) for example).

On use of the biodegradable copolymers according to the invention, for example in the packaging sector, eg. for foodstuffs, it is as a rule desirable to select the lowest possible content of catalyst employed and not to employ any toxic compounds. In contrast to other heavy metals such as lead, tin, antimony, cadmium, chromium, etc., titanium and zing compounds are nontoxic as a rule (Sax Toxic Substance Data Book, Shizuo Fujiyama, Maruzen, K. K., 360 S. (cited in EP-A 565,235), see also Römpp Chemie Lexikon Vol. 6, Thieme Verlag, Stuttgart, New York, 9th Edition, 1992, pages 4626–4633 and 5136–5143). Examples which may be mentioned are: dibutoxydiacetoacetoxytitanium, tetrabutyl orthotitanate and zinc(II) acetate.

The ratio by weight of catalyst to polyesteramide P1 is normally in the range from 0.01:100 to 3:100, preferably from 0.05:100 to 2:100, it also being possible to employ smaller amounts, such as 0.0001:100, in the case of highly active titanium compounds.

The catalyst can be employed right at the start of the reaction, directly shortly before the removal of the excess diol or, if required, also distributed in a plurality of portions during the preparation of the biodegradable polyesteramides P1. It is also possible if required to employ different catalysts or mixtures thereof.

The biodegradable polyesteramides P2 according to the invention have a molecular weight ($M_n$) in the range from 4000 to 40,000, preferably from 5000 to 35,000, particularly preferably from 8000 to 35,000, g/mol, a viscosity number in the range from 30 to 450, preferably from 50 to 400, g/ml (measured in o-dichlorobenzene/phenol (50/50 ratio by weight) at a concentration of 0.5% by weight of polyesteramide P2 at 25° C. ) and a melting point in the range from 50 to 255, preferably from 60 to 255° C.

The biodegradable polyesteramides P2 are obtained according to the invention by reacting a mixture consisting essentially of (b$_1$)a mixture consisting essentially of
  35–95, preferably from 45 to 80, particularly preferably from 45 to 70, mol % of adipic acid or ester-forming derivatives thereof or mixtures thereof,
  5–65, preferably from 20 to 55, particularly preferably from 30 to 55, mol % of terephthalic acid or ester-forming derivatives thereof or mixtures thereof, and
  0–5, preferably from 0 to 3, particularly preferably from 0.1 to 2, mol % of a compound containing sulfonate groups,
  where the total of the individual mole percentages is 100 mol %, (b2) mixture (a2),
  where the molar ratio of (b$_1$) to (b$_2$) is chosen in the range from 0.4:1 to 1.5:1, preferably from 0.6:1 to 1.1:1, (b$_3$) from 0.01 to 40, preferably from 0.1 to 30, particularly preferably from 0.5 to 20%, by weight, based on component (b$_1$), of an amino carboxylic acid B1, and (b$_4$) from 0 to 5, preferably from 0 to 4, particularly preferably from 0.01 to 3.5, mol %, based on component (b$_1$), of compound D, where the amino carboxylic acid B1 is selected from the group consisting of the natural amino acids, polyamides with a molecular weight not exceeding 18,000 g/mol, preferably not exceeding 15,000 g/mol, and compounds which are defined by the formulae IIa or IIb

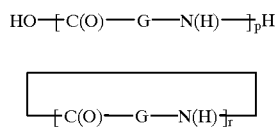

where p is an integer from 1 to 1500, preferably from 1 to 1000, r is 1, 2, 3 or 4, preferably 1 and 2, and G is a radical selected from the group consisting of phenylene, —(CH$_2$)$_n$—, where n is an integer from 1 to 12, preferably 1, 5 or 12, —C(R$^2$)H— and —C(R$^2$)HCH$_2$ where R$^2$ is methyl or ethyl, and polyoxazolines of the general formula III

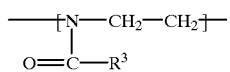

where R$^3$ is hydrogen, C$_1$–C$_6$-alkyl, C$_5$–C$_8$-cycloalkyl, phenyl which is unsubstituted or substituted up to three times by C$_1$–C$_4$-alkyl groups, or tetrahydrofuryl.

The natural amino acids which are preferably used are the following: glycine, aspartic acid, glutamic acid, alanine, valine, leucine, isoleucine, tryptophan, phenylalanine and oligo- and polymers obtainable therefrom, such as polyaspartimides and polyglutamimides, particularly preferably glycine.

The polyamides employed are those obtainable by polycondensation of a dicarboxylic acid with 4 to 6 carbon atoms and a diamine with 4 to 10 carbon atoms, such as tetramethylenediamine, pentamethylenediamine, hexamethylenediamine, heptamethylenediamine, octamethylenediamine, nonamethylenediamine and decamethylenediamine.

Preferred polyamides are polyamide-46, polyamide-66 and polyamide-610. These polyamides are generally prepared by conventional methods. It is self-evident that these polyamides can contain conventional additives and auxiliaries and that these polyamides can be prepared by using appropriate regulators.

The polyoxazolines III are, as a rule, prepared by the process described in DE-A 1,206,585.

Particularly preferred compounds defined by the formulae IIa or IIb are: 6-aminohexanoic acid, caprolactam, laurolactam and the oligomers and polymers thereof with a molecular weight not exceeding 18,000 g/mol.

The biodegradable polyesteramides P2 are expediently prepared in a similar way to the preparation of the polyesteramides P1, it being possible to add the amino carboxylic acid B1 both at the start of the reaction and after the esterification or transesterification stage.

The biodegradable polyesteramides Q1 according to the invention have a molecular weight (M$_n$) in the range from 5000 to 50,000, preferably from 6000 to 40,000, particularly preferably from 8000 to 35,000, g/mol, a viscosity number in the range from 30 to 450, preferably from 50 to 400, g/ml (measured in o-dichlorobenzene/ phenol) (50/50% by weight) at a concentration of 0.5% by weight of polyesteramide Q1 at 25° C.) and a melting point in the range from 50 to 255, preferably from 60 to 255° C.

The polyesteramides Q1 are obtained according to the invention by reacting a mixture consisting essentially of (c1) polyesteramide P1, (c2) 0.01–50, preferably from 0.1 to 40, % by weight, based on (c1), of amino carboxylic acid B1, and (c3) 0–5, preferably from 0 to 4, mol %, based on component (a1) from the preparation of P1, of compound D.

The reaction of the polyesteramides P1 with amino carboxylic acid B1, if required in the presence of compound D, preferably takes place in the melt at from 120 to 260° C. under an inert gas atmosphere, if desired also under reduced pressure. The procedure can be both batchwise and continuous, for example in stirred vessels or (reaction) extruders.

The reaction rate can, if required, be increased by adding conventional transesterification catalysts (see those described hereinbefore for the preparation of the polyesteramides P1).

When components B1 with higher molecular weights, for example with a p above 10 (ten) are used, it is possible to obtain, by reaction with the polyesteramides P1 in stirred vessels or extruders, the desired block structures by the choice of the reaction conditions such as temperature, holdup time and addition of transesterification catalysts such as the abovementioned. Thus, J. of Appl. Polym. Sci., 32 (1986) 6191–6207 and Makromol. Chemie, 136 (1970) 311–313 disclose that in the reaction in the melt it is possible to obtain from a blend by transesterification reactions initially block copolymers and then random copolymers.

The biodegradable polyesteramides Q2 according to the invention have a molecular weight (M$_n$) in the range from 5000 to 50,000, preferably from 6000 to 50,000, particularly preferably from 8000 to 35,000, g/mol, a viscosity number in the range from 30 to 450, preferably from 50 to 400, g/ml (measured in o-dichlorobenzene/phenol (50/50% by weight) at a concentration of 0.5% by weight of polyesteramide Q2 at 25° C.) and a melting point in the range from 50 to 220° C., preferably from 60 to 220° C.

The polyesteramides Q2 are obtained according to the invention by reacting a mixture consisting essentially of (d1) from 95 to 99.9, preferably from 96 to 99.8, particularly preferably from 97 to 99.65, % by weight of polyesteramide P1, (d2) from 0.1 to 5, preferably 0.2–4, particularly preferably from 0.35 to 3%, by weight of a diisocyanate C1 and (d3) from 0 to 5, preferably from 0 to 4, mol %, based on component (a1) from the preparation of P1, of compound D.

It is possible according to observations to date to employ as diisocyanate C1 all conventional and commercially obtainable diisocyanates. A diisocyanate which is selected from the group consisting of tolylene 2,4-diisocyanate, tolylene 2,6-diisocyanate, 4,4'- and 2,4'-diphenylmethane diisocyanate, naphthylene 1,5-diisocyanate, xylylene diisocyanate, hexamethylene diisocyanate, isophorone diisocyanate and methylenebis (4-isocyanatocyclohexane), particularly preferably hexamethylene diisocyanate, is preferably employed.

It is also possible in principle to employ trifunctional isocyanate compounds which may contain isocyanurate and/ or biuret groups with a functionality of not less than three, or to replace the diisocyanate compounds C1 partially by tri- or polyisocyanates. The polyesteramides P1 are reacted with the diisocyanate C1 preferably in the melt, it being necessary to take care that, if possible, no side reactions which may lead to crosslinking or gel formation occur. In a particular embodiment, the reaction is normally carried out at from 130 to 240, preferably from 140 to 220° C., with the addition of the diisocyanate advantageously taking place in a plurality of portions or continuously.

If required it is also possible to carry out the reaction of the polyesteramide P1 with the diisocyanate C1 in the presence of conventional inert solvents such as toluene, methyl ethyl ketone or dimethylformamide (DMF) or mixtures thereof, in which case the reaction is as a rule carried out at from 80 to 200, preferably from 90 to 150° C.

The reaction with the diisocyanate C1 can be carried out batchwise or continuously, for example in stirred vessels, reaction extruders or through mixing heads.

It is also possible to employ in the reaction of the polyesteramides P1 with the diisocyanates C1 conventional catalysts which are disclosed in the prior art (for example those described in EP-A 534 295) or which can be or have been used in the preparation of the polyesteramides P1 and Q1 and, if the polyesteramides P1 have not been isolated in the preparation of polyesteramide Q2, can now be used further.

Examples which may be mentioned are: tertiary amines such as triethylamine, dimethylcyclohexylamine, N-methylmorpholine, N,N'-dimethylpiperazine, diazabicyclo[2.2.2]octane and the like and, in particular, organic metal compounds such as titanium compounds, iron compounds, tin compounds, eg. dibutoxydiacetoacetoxytitanium, tetrabutyl orthotitanate, tin diacetate, dioctoate, dilaurate or the dialkyltin salts of aliphatic carboxylic acids such as dibutyltin diacetate, dibutyltin dilaurate or the like, it again being necessary to take care that, if possible, no toxic compounds ought to be employed.

Although the theoretical optimum for the reaction of P1 with diisocyanates C1 is a 1:1 molar ratio of isocyanate functionality to P1 end group (polyesteramides P1 with mainly hydroxyl end groups are preferred), the reaction can also be carried out without technical problems at molar ratios of from 1:3 to 1.5:1. With molar ratios of >1:1 it is possible if desired to add, during the reaction or else after the reaction, a chain extender selected from the components (a2), preferably a $C_2$–$C_6$-diol.

The biodegradable polymers T1 according to the invention have a molecular weight ($M_n$) in the range from 6000 to 50,000, preferably from 8000 to 40,000, particularly preferably from 8000 to 35,000, g/mol, a viscosity number in the range from 30 to 450, preferably from 50 to 400, g/ml (measured in o-dichlorobenzene/phenol (50/50 ratio by weight) at a concentration of 0.5% by weight of polymer T1 at 25° C.) and a melting point in the range from 50 to 255, preferably from 60 to 255° C.

The biodegradable polymers T1 are obtained according to the invention by reacting a polyesteramide Q1 as claimed in claim 3 with (e1) 0.1–5, preferably from 0.2 to 4, particularly preferably from 0.3 to 2.5%, by weight, based on the polyesteramide Q1, of diisocyanate C1 and with (e2) 0–5, preferably from 0 to 4, mol %, based on component (a1) from the preparation of polyesteramide Q1 via polyesteramide P1, of compound D.

This normally results in a chain extension, with the resulting polymer chains preferably having a block structure.

As a rule, the reaction takes place in a similar way to the preparation of the polyesteramides Q2.

The biodegradable polymers T2 according to the invention have a molecular weight ($M_n$) in the range from 6000 to 50,000, preferably from 8000 to 40,000, particularly preferably from 8000 to 35,000, g/mol, a viscosity number in the range from 30 to 450, preferably from 50 to 400, g/ml (measured in o-dichlorobenzene/phenol (50/50 ratio by weight) at a concentration of 0.5% by weight of polymer T2 at 25° C.) and a melting point in the range from 50 to 255, preferably from 60 to 255° C.

The biodegradable polymers T2 are obtained according to the invention by reacting the polyesteramide Q2 with (f1) 0.01–50, preferably from 0.1 to 40%, by weight, based on the polyesteramide Q2, of amino carboxylic acid B1 and with (f2) 0–5, preferably from 0 to 4, mol %, based on component (a1) from the preparation of polyesteramide Q2 via polyester-amide P1, of compound D, the procedure expediently being similar to the reaction of polyesteramide P1 with amino carboxylic acid B1 to give polyesteramide Q1.

The biodegradable polymers T3 according to the invention have a molecular weight ($M_n$) in the range from 6000 to 50,000, preferably from 8000 to 40,000, particularly preferably from 8000 to 35,000, g/mol, a viscosity number in the range from 30 to 450, preferably from 50 to 400, g/ml (measured in o-dichlorobenzene/phenol (50/50 ratio by weight) at a concentration of 0.5% by weight of polymer T3 at 25° C.) and a melting point in the range from 50 to 255, preferably from 60 to 255° C.

The biodegradable polymers T3 are obtained according to the invention by reacting (g1) polyesteramide P2, or (g2) a mixture consisting essentially of polyesteramide P1 and 0.01–50, preferably from 0.1 to 40%, by weight, based on the polyesteramide P1, of amino carboxylic acid B1, or (g3) a mixture consisting essentially of polyesteramides P1 which differ from one another in composition, with 0.1–5, preferably from 0.2 to 4, particularly preferably from 0.3 to 2.5%, by weight, based on the amount of the polyesteramides used, of diisocyanate C1 and with 0–5, preferably from 0 to 4, mol %, based on the particular molar amounts of component (a1) used to prepare the polyesteramides (g1) to (g3) used, of compound D, expediently carrying out the reactions in a similar way to the preparation of the polyesteramides Q2 from the polyesteramides P1 and the diisocyanates C1.

In a preferred embodiment, polyesteramides P2 whose repeating units are randomly distributed in the molecule are employed.

However, it is also possible to employ polyesteramides P2 whose polymer chains have block structures. Polyesteramides P2 of this type can generally be obtained by appropriate choice, in particular of the molecular weight, of the amino carboxylic acid B1. Thus, according to observations to date there is generally only incomplete transesterification or transamidation when a high molecular weight amino carboxylic acid B1 is used, in particular with a p above 10, for example even in the presence of the inactivators described above (see J. of Appl. Polym. Sci. 32 (1986) 6191–6207 and Makromol. Chemie 136 (1970) 311–313).

If required, the reaction can also be carried out in solution using the solvents mentioned for the preparation of the polymers T1 from the polyesteramides Q1 and the diisocyanates C1.

The biodegradable thermoplastic molding compositions T4 are obtained according to the invention by mixing in a conventional way, preferably with the addition of conventional additives such as stabilizers, processing aids, fillers etc. (see J. of Appl. Polym. Sci. 32 (1986) 6191–6207; WO 92/0441; EP 515,203; Kunststoff-Handbuch, Vol. 3/1, Carl Hanser Verlag Munich, 1992,pages 24–28)

(h1) 99.5–0.5% by weight of a polymer selected from the group of P1, P2, Q2 and T3 with (h2) 0.5–99.5% by weight of a hydroxy carboxylic acid H1 of the general formula IVa or IVb

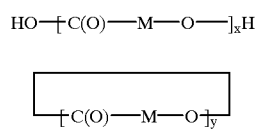

where x is an integer from 1 to 1500, preferably from 1 to 1000, and y is 1, 2, 3 or 4, preferably 1 and 2, and M is a radical selected from the group consisting of phenylene, $-(CH_2)_z-$, where z is an integer from 1, 2, 3, 4 or 5, preferably 1 and 5, $-C(R^2)H-$ and $-C(R^2)HCH_2$, where $R^2$ is methyl or ethyl.

The hydroxy carboxylic acid H1 employed in a preferred embodiment is: glycolic acid, D-, L- or D,L-lactic acid, 6-hydroxyhexanoic acid, the cyclic derivatives thereof such as glycolide (1,4-dioxane-2,5-dione), D-, L-dilactide (3,6-dimethyl-1,4-dioxane-2,5-dione), p-hydroxybenzoic acid and the oligomers and polymers thereof, such as 3-polyhydroxybutyric acid, polyhydroxyvaleric acid, polylactide (obtainable as EcoPLA® (from Cargill) for example) and a mixture of 3-polyhydroxybutyric acid and polyhydroxyvaleric acid (the latter is obtainable from Zeneca under the name Biopol®).

In a preferred embodiment, high molecular weight hydroxy carboxylic acids H1 such as polycaprolactone or polylactide or polyglycolide with a molecular weight ($M_n$) in the range from 10,000 to 150,000, preferably from 10,000 to 100,000, g/mol are employed.

WO 92/0441 and EP-A 515,203 disclose that high molecular weight polylactide without added plasticizers is too brittle for most applications. It is possible in a preferred embodiment to prepare a blend starting from 0.5–20, preferably from 0.5 to 10%, by weight of polyesteramide P1 as claimed in claim 1 or polyesteramide Q2 as claimed in claim 4 and 99.5–80, preferably from 99.5 to 90%, by weight of polylactide, which displays a distinct improvement in the mechanical properties, for example an increase in the impact strength, compared with pure polylactide.

Another preferred embodiment relates to a blend obtainable by mixing from 99.5 to 40, preferably from 99.5 to 60%, by weight of polyesteramide P1 as claimed in claim 1 or polyesteramide Q2 as claimed in claim 4 and from 0.5 to 60, preferably from 0.5 to 40%, by weight of a high molecular weight hydroxy carboxylic acid H1, particularly preferably polylactide, polyglycolide, 3-polyhydroxybutyric acid and polycaprolactone. Blends of this type are completely biodegradable and, according to observations to date, have very good mechanical properties.

According to observations to date, the thermoplastic molding compositions T4 according to the invention are preferably obtained by observing short mixing times, for example when carrying out the mixing in an extruder. It is also possible to obtain molding compositions which have predominantly blend structures by choice of the mixing parameters, in particular the mixing time and, if required, the use of inactivators, ie. it is possible to control the mixing process so that transesterification reactions can also take place at least partly.

In another preferred embodiment it is possible to replace 0–50, preferably 0–30, mol % of the adipic acid or the ester-forming derivatives thereof or the mixtures thereof by at least one other aliphatic $C_4-C_{10}$- or cycloaliphatic $C_5-C_{10}$-dicarboxylic acid or dimer fatty acid such as succinic acid, glutaric acid, pimelic acid, suberic acid, azelaic acid or sebacic acid or an ester derivative such as the di-$C_1$-$C_6$-alkyl esters thereof or the anhydrides thereof such as succinic anhydride, or mixtures thereof, preferably succinic acid, succinic anhydride, sebacic acid, dimer fatty acid and di-$C_1$-$C_6$-alkyl esters such as dimethyl, diethyl, di-n-propyl, diisobutyl, di-n-pentyl, dineopentyl, di-n-hexyl esters thereof, especially dimethylsuccinic acid ester.

A particularly preferred embodiment relates to the use as component (a1) of the mixture, described in EP-A 7445, of succinic acid, adipic acid and glutaric acid and the $C_1-C_6$-alkyl esters thereof, especially the dimethyl esters.

In another preferred embodiment it is possible to replace 0–50, preferably 0–40, mol % of the terephthalic acid or the ester-forming derivatives thereof, or the mixtures thereof, by at least one other aromatic dicarboxylic acid such as isophthalic acid, phthalic acid or 2,6-naphthalenedicarboxylic acid, preferably isophthalic acid, or an ester derivative such as a di-$C_1$-$C_6$-alkyl ester, in particular the dimethyl ester, or mixtures thereof.

It should be noted in general that the various polymers according to the invention can be worked up in a conventional way by isolating the polymers or, in particular, if it is wished to react the polyesteramides P1, P2, Q1 and Q2 further, by not isolating the polymers but immediately processing them further. The polymers according to the invention can be applied to coating substrates by rolling, spreading, spraying or pouring. Preferred coating substrates are those which are compostable or rot such as moldings of paper, cellulose or starch.

The polymers according to the invention can also be used to produce moldings which are compostable. Moldings which may be mentioned by way of example are: disposable articles such as crockery, cutlery, refuse sacks, sheets for agriculture to advance harvesting, packaging sheets and vessels for growing plants.

It is furthermore possible to spin the polymers according to the invention into threads in a conventional way. The threads can, if required, be stretched, stretch-twisted, stretch-wound, stretch-warped, stretch-sized and stretch-texturized by customary methods. The stretching to flat yarn can moreover take place in the same working step (fully drawn yarn or fully oriented yarn) or in a separate step. The stretch warping, stretch sizing and stretch texturizing are generally carried out in a working step separate from the spinning. The threads can be further processed to fibers in a conventional way. Sheet-like structures can then be obtained from the fibers by weaving or knitting.

The moldings, coating compositions and threads etc. described above can, if required, also contain fillers which can be incorporated during the polymerization process at any stage or subsequently, for example in a melt of the polymers according to the invention.

It is possible to add from 0 to 80% by weight of fillers, based on the polymers according to the invention. Examples of suitable fillers are carbon black, starch, lignin powder, cellulose fibers, natural fibers such as sisal and hemp, iron oxides, clay minerals, ores, calcium carbonate, calcium sulfate, barium sulfate and titanium dioxide. The fillers can in some cases also contain stabilizers such as tocopherol (vitamin E), organic phosphorus compounds, mono-, di- and polyphenols, hydroquinones, diarylamines, thioethers, UV stabilizers, nucleating agents such as talc, and lubricants and mold release agents based on hydrocarbons, fatty alcohols, higher carboxylic acids, metal salts of higher carboxylic acids such as calcium and zing stearate, and montan waxes. Such stabilizers etc. are described in detail in Kunststoff-Handbuch, Vol. 3/1, Carl Hanser Verlag, Munich, 1992, pages 24–28.

The polymers according to the invention can additionally be colored in any desired way by adding organic or inorganic dyes. The dyes can also in the widest sense be regarded as filler.

A particular application of the polymers according to the invention relates to the use as compostable sheet of a compostable coating as outer layer of diapers. The outer layer of the diapers effectively prevents penetration by liquids which are absorbed inside the diaper by the fluff and superabsorbers, preferably by biodegradable superabsorbers, for example based on crosslinked polyacrylic acid or crosslinked polyacrylamide. It is possible to use a web of a cellulose material as inner layer of the diaper. The outer layer of the described diapers is biodegradable and thus compostable. It disintegrates on composting so that the entire diaper rots, whereas diapers provided with an outer layer of, for example, polyethylene cannot be composted without previous reduction in size or elaborate removal of the polyethylene sheet.

Another preferred use of the polymers and molding compositions according to the invention relates to the production of adhesives in a conventional way (see, for example, Encycl. of Polym. Sc. and Eng. Vol.1, "Adhesive Compositions", pages 547–577). The polymers and molding compositions according to the invention can also be processed as disclosed in EP-A 21042 using suitable tackifying thermoplastic resins, preferably natural resins, by the methods described therein. The polymers and molding compositions according to the invention can also be further processed as disclosed in DE-A 4 234 305 to solvent-free adhesive systems such as hot melt sheets.

Another preferred application relates to the production of completely degradable blends with starch mixtures (preferably with thermoplastic starch as described in WO 90/05161) in a similar process to that described in DE-A 42 37 535. The polymers according to the invention can in this case be mixed both as granules and as polymer melts with starch mixtures, and admixing as polymer melt is preferred because this allows one process step (granulation) to be saved (direct finishing). The polymers and thermoplastic molding compositions according to the invention can, according to observations to date, because of their hydrophobic nature, their mechanical properties, their complete biodegradability, their good compatibility with thermoplastic starch and not least because of their favorable raw material basis, advantageously be employed as synthetic blend component.

Further applications relate, for example, to the use of the polymers according to the invention in agricultural mulch, packaging material for seeds and nutrients, substrate in adhesive sheets, baby pants, pouches, bed sheets, bottles, boxes, dust bags, labels, cushion coverings, protective clothing, hygiene articles, handkerchiefs, toys and wipes.

Another use of the polymers and molding compositions according to the invention relates to the production of foams, generally by conventional methods (see EP-A 372 846; Handbook of Polymeric foams and Foam Technology, Hanser Publisher, Munich, 1991, pages 375–408). This normally entails the polymer or molding composition according to the invention being initially melted, if required with the addition of up to 5% by weight of compound D, preferably pyromellitic dianhydride and trimellitic anhydride, then a blowing agent being added and the resulting mixture being exposed to reduced pressure by extrusion, resulting in foaming.

The advantages of the polymers according to the invention over known biodegradable polymers are a favorable raw material basis with readily available starting materials such as adipic acid, terephthalic acid and conventional diols, interesting mechanical properties due to the combination of "hard" (owing to the aromatic dicarboxylic acids such as terephthalic acid) and "soft" (owing to the aliphatic dicarboxylic acids such as adipic acid) segments in the polymer chain and the variation in uses due to simple modifications, a satisfactory degradation by microorganisms, especially in compost and soil, and a certain resistance to microorganisms in aqueous systems at room temperature, which is particularly advantageous for many applications. The random incorporation of the aromatic dicarboxylic acids of components (a1) in various polymers makes the biological attack possible and thus achieves the desired biodegradability. A particular advantage of the polymers according to the invention is that it is possible by tailoring the formulations to optimize both the biodegradation and the mechanical properties for the particular application.

It is furthermore possible depending on the preparation process advantageously to obtain polymers with predominantly random distribution of monomer units, polymers with predominantly block structures and polymers with predominantly blend structure or blends.

EXAMPLES

Enzyme Test

The polymers with cooled with liquid nitrogen or dry ice and finely ground in a mill (the rate of enzymatic breakdown increases with the surface area of the milled material). To carry out the actual enzyme test, 30 mg of finely ground polymer powder and 2 ml of a 20 mmol aqueous $K_2HPO_4/KH_2PO_4$ buffer solution (pH: 7.0) were placed in an Eppendorf tube (2 ml) and equilibrated at 37° C. in a tube rotator for 3 h. Subsequently 100 units of lipase from either Rhizopus arrhizus, Rhizopus delemar or Pseudomonas pl. were added, and the mixture was incubated at $_{37}$° C. while agitating (250 rpm) on the tube rotator for 16 h. The reaction mixture was then filtered through a Millipore® membrane (0.45 μm), and the DOC (dissolved organic carbon) of the filtrate was measured. A DOC measurement was carried out with only buffer and enzyme (as enzyme control) and with only buffer and sample (as blank) in a similar way.

The determined ΔDOC values (DOC (sample+enzyme)-DOC (enzyme control)-DOC (blank) can be regarded as a measure of the enzymatic degradability of the samples. They are represented in each case by comparison with a measurement with a powder of Polycaprolactone® Tone P 787 (Union Carbide). It should be noted in the assessment that these are not absolutely quantifiable data. Mention has already been made hereinbefore of the connection between the surface area of the milled material and the rate of enzymatic degradation. Furthermore, the enzymatic activities may also vary.

The transmission and permeability for oxygen was determined by the DIN 53380 method, and that for water vapor was determined by the DIN 53122 method.

The molecular weights were measured by gel permeation chromatography (GPC):
- stationary phase: 5 MIXED B polystyrene gel columns (7.5×300 mm, PL gel 10 $\mu$) from Polymer Laboratories; equilibration: 35° C.
- mobile phase: tetrahydrofuran (flow rate: 1.2 ml/min).

Calibration: molecular weight 500–10,000,000 g/mol with PS calibration kit from Polymer Laboratories.

In the ethylbenzene/1,3-diphenylbutane/1,3,5-triphenylhexane/1,3,5,7-tetraphenyloctane/1,3,5,7,9-pentaphenyldecane oligomer range.

Detection: RI (refractive index) Waters 410 UV (at 254 nm) Spectra Physics 100.

Abbreviations used:
- DOC: dissolved organic carbon
- DMT: dimethyl terephthalate
- PCL: Polycaprolactone® Tone P 787 (Union Carbide)
- PMDA: pyromellitic dianhydride
- AN: acid number
- TBOT: tetrabutyl orthotitanate
- VN: viscosity number (measured in o-dichlorobenzene/phenol (50/50 ratio by weight) at a concentration of 0.5% by weight of polymer at 25° C.
- $T_m$: melting temperature=temperature at which a maximum endothermic heat flux occurs (extreme of the DSC plots)
- $T_g$: glass transition temperature (midpoint of the DSC plots)

B 15 (not extracted):
Polyamide-6 with a residual extract of about 10.5% by weight, VN: 68 g/ml B 15 (extracted, dried):
Polyamide-6 with a residual extract <0.4% by weight, VN: 85 g/ml Ultramid® 9A (BASF):
Copolyamide of AH salt and caprolactam with 90% polyamide-66 and 10% polyamide-6 units, VN: 75 g/ml.

The DSC measurements were carried out with a 912+ thermal analyzer 990 from DuPont. The temperature and enthalpy calibration was carried out in a conventional way. The sample typically weighed 13 mg. The heating and cooling rates were 20 K/min unless otherwise indicated.

The samples were measured under the following conditions:
1. heating run on samples in the state as supplied,
2. rapid cooling from the melt,
3. heating run on the samples cooled from the melt (samples from 2). The second DSC runs in each case were used, after impressing a uniform thermal prehistory, to make it possible to compare the various samples.

The hydroxyl number (OH number) and acid number (AN) were determined by the following methods:

a) Determination of the apparent hydroxyl number 10 ml of toluene and 9.8 ml of acetylating reagent (see below) were added to about 1 to 2 g of accurately weighed test substance, and the mixture was heated with stirring at 95° C. for 1 h. Then 5 ml of distilled water were added. After cooling to room temperature, 50 ml of tetrahydrofuran (THF) were added, and the mixture was titrated to the turning point against ethanolic KOH standard solution using a potentiograph.

The experiment was repeated without test substance (blank sample).

The apparent OH number was then determined from the following formula:

apparent OH number c×t×56.1 (V2−V1)/m (in mg KOH/g) where
- c=amount of substance concentration of the ethanolic KOH standard solution in mol/l,
- t=titer of the ethanolic KOH standard solution
- m=weight of test substance in mg
- V1=ml of standard solution used with test substance
- V2=ml of standard solution used without test substance.

Reagents used:
- ethanolic KOH standard solution, C=0.5 mol/l, titer 0.9933 (Merck, Cat. No. 1.09114)
- acetic anhydride, analytical grade (Merck, Cat. No. 42)
- pyridine, analytical grade (Riedel de Haen, Cat. No. 33638)
- acetic acid, analytical grade (Merck, Cat. No. 1.00063)
- acetylating reagent: 810 ml of pyridine, 100 ml of acetic anhydride and 9 ml of acetic acid
- water, deionized
- THF and toluene b) Determination of the acid number (AN) 10 ml of toluene and 10 ml of pyridine were added to about 1 to 1.5 g of accurately weighed test substance, and the mixture was then heated to 95° C. After a solution was obtained, it was cooled to room temperature and, after addition of 5 ml of water and 50 ml of THF, titrated against 0.1 N ethanolic KOH standard solution.

The determination was repeated without test substance (blank sample).

The acid number was then determined using the following formula:

$$AN = c \times t \times 56.1 \, (V1-V2)/m \text{ (in mg } KOH/g)$$

where
- c=amount of substance concentration of the ethanolic KOH standard solution in mol/l,
- t=titer of the ethanolic KOH standard solution
- m=weight of test substance in mg
- V1=ml of standard solution used with the test substance
- V2=ml of standard solution used without test substance.

Reagents used:
- ethanolic KOH standard solution, c 0.1 mol/l, titer= 0.9913 (Merck, Cat. No. 9115)
- pyridine, analytical grade (Riedel de Haen, Cat. No. 33638) water, deionized THF and toluene.

c) Determination of the OH number+AN.

The OH number is obtained from the sum of the apparent OH number and the AN:

OH number=apparent OH number+AN.

Preparation of the polyesteramides

EXAMPLE 1

4672 kg of 1,4-butanediol, 7000 kg of adipic acid and 50 g of tin dioctoate were reacted under a nitrogen atmosphere at a temperature in the range from 230 to 240° C. After most of the water which was formed in the reaction had been removed by distillation, 10 g of TBOT were added to the mixture. After the acid number had fallen below 1, excess 1,4-butanediol was removed by distillation under reduced pressure until the OH number reached 56.

EXAMPLE 2

58.5 g of DMT were heated to 180° C. with 36.5 g of ethanolamine by slow stirring in a vessel under a nitrogen atmosphere. After 30 min, under a nitrogen atmosphere, 360 g of the polymer from Example 1, 175 g of DMT, 0.65 g of pyromellitic dianhydride, 340 g of 1,4-butanediol and 1 g of TBOT were added. During this, the methanol formed in the transesterification and water were removed by distillation. The mixture was heated to 230° C. while increasing the stirring speed over the course of 3 h, and, after 2 h, 0.4 g of 50% by weight aqueous phosphorous acid were added. The pressure was reduced to 5 mbar over the course of 2 h and then maintained at <2 mbar and 240° C. for 1 h, during which the excess 1,4-butanediol was removed by distillation. An elastic, pale brown product was obtained.

OH number: 2 mg KOH/g
AN: 0.4 mg KOH/g
prim. amine: <0.1 g/100 g
$T_m$: 66° C., 88° C.,
$T_g$: –29° C. (DSC, rapidly cooled from 250° C.)

EXAMPLE 3

227 g of DMT were heated to 180° C. with 69.7 g of hexamethylenediamine in a vessel by slow stirring under a nitrogen atmosphere. After 30 min, under a nitrogen atmosphere, 360 g of the polymer from Example 1, 8 g of sodium dimethyl sulfoisophthalate, 340 g of 1,4-butanediol and 1 g of TBOT were added. During this, the methanol which was formed in the transesterification was removed by distillation. The mixture was heated to 230° C. while increasing the stirring speed over the course of 3 h and, after 2 h, 0.4 g of 50% by weight aqueous phosphorous acid was added. The pressure was reduced to 5 mbar over the course of 2 h and then maintained at <2 mbar and 240° C. for 1 h, during which the excess 1,4-butanediol was removed by distillation. An elastic, pale brown product was obtained.

OH number: 5 mg KOH/g
AN: 2.6 mg KOH/g
prim. amine: <0.1 g/100 g
$T_m$: 123° C.
$T_g$: –36° C. (DSC, rapidly cooled from 250° C.)

EXAMPLE 4

360.4 g of the polymer from Example 1, 233 g of DMT, 340 g of 1,4-butanediol and 1 g of TBOT were heated to 180° C. by slow stirring in a vessel under a nitrogen atmosphere. During this, the methanol formed in the transesterification was removed by distillation. The mixture was heated to 230° C. while increasing the stirring speed over the course of 3 h, and 62.5 g of B 15 (not extracted) were added. After 2 h, 0.4 g of 50% by weight aqueous phosphorous acid was added. The pressure was reduced to 5 mbar over the course of 2 h and then maintained at <2 mbar and 240° C. for 1 h, during which the excess 1,4-butanediol was removed by distillation.

OH number: 8 mg KOH/g
AN: 0.5 mg KOH/g
prim. amine: <0.1 g/100 g
VN: 85.2 g/ml
$T_m$: 103.2° C., 216° C.
$T_g$: –38° C. (DSC, rapidly cooled from 250° C.)

EXAMPLE 5

360.4 g of the polymer from Example 1, 233 g of DMT, 340 g of 1,4-butanediol, 62.5 g of B 15 (extracted, dried) and 1 g of TBOT were heated to 180° C. in a vessel by slow stirring under a nitrogen atmosphere. During this, the methanol formed in the transesterification was removed by distillation. The mixture was heated to 230° C. while increasing the stirring speed over the course of 3 h. After 2 h, 0.4 g of 50% by weight aqueous phosphorous acid were added. The pressure was reduced to 5 mbar over the course of 2 h and then maintained at <2 mbar and 240° C. for 1 h, during which the excess 1,4-butanediol was removed by distillation.

OH number: 9 mg KOH/g
AN: 0.6 mg KOH/g
prim. amine: <0.1 g/100 g
VN: 98.9 g/ml
$T_m$: 104.2° C., 214.8° C.
$T_g$: –37° C. (DSC, rapidly cooled from 250° C.)
Enzyme test with *Rhizopus arrhizus*:
ΔDOC: 265 mg/l/ΔDOC (PCL): 2019 mg/l

EXAMPLE 6

360.4 g of the polymer from Example 1, 227.2 g of DMT, 340 g of 1,4-butanediol, 6.5 g of pyromellitic dianhydride, 62.5 g of Ultramid® 9A and 1 g of TBOT were heated to 180° C. by slow stirring in a vessel under a nitrogen atmosphere. During this, the methanol formed in the transesterification was removed by distillation. The mixture was heated to 230° C. while increasing the stirring speed over the course of 3 h. After 1 h, 0.4 g of 50% by weight aqueous phosphorous acid was added. The pressure was reduced to 5 mbar over the course of 2 h and then maintained at <2 mbar and 240° C. for 2 h, during which the excess 1,4-butanediol was removed by distillation.

OH number: 11 mg KOH/g
AN: 3.8 mg KOH/g
prim. amine: <0.1 g/100 g
VN: 117 g/ml
$T_m$: 99.9° C., 226.4° C.
$T_g$: –37° C. (DSC, rapidly cooled from 250° C.)

Example 7

90 g of the polymer from Example 4 were heated to 180° C. with 60 g of polylactide and 0.75 g of pyromellitic dianhydride under a nitrogen atmosphere and stirred for 2 hours. Subsequently, 1.21 g of hexamethylene diisocyanate were added over the course of min, and the mixture was then stirred for 30 min.

Product after HDI addition:
VN: 81 g/ml
$T_g$: about –58° C., 44.5° C.(DSC, state as supplied)
$T_m$: 61.5° C. (DSC, state as supplied).

EXAMPLE 8

150 g of the polymer from Example 3 were heated to 180° C. with 0.75 g of pyromellitic dianhydride under a nitrogen atmosphere and stirred for 2 hours. Subsequently, 1.10 g of hexamethylene diisocyanate were added over the course of 15 min, and the mixture was then stirred for 30 min.

Product after HDI addition:
OH number: 2 mg KOH/g
Acid number: 2.7 mg KOH/g

We claim:

1. A biodegradable polyesteramide P1 having a molecular weight ($M_n$) of from 4000 to 40,000 g/mol, a viscosity number of from 30 to 350 g/ml (measured in o-dichlorobgnzene/phenol (50/50 ratio by weight) at a concentration of 0.5% by weight of polyesteramide P1 at 25° C.) and a melting point of from 50 to 220° C. P1 being obtained by reacting a mixture consisting essentially of $a_1$) a mixture consisting essentially of
35–95 mol % of adipic acid or ester-forming derivatives thereof or mixtures thereof,
5–65 mol % of terephthalic acid or ester-forming derivatives thereof or mixtures thereof, and
0–5 mol % of a compound containing sulfonate groups, where the total of the individual mole percentages is 100 mol %, and $a_2$) a mixture consisting essentially of
$a_{21}$) 99.5–0.5 mol % of a dihydroxy compound selected from the group consisting of $C_2$–$C_6$-alkanediols and $C_5$–$C_{10}$-cycloalkanediols,
$a_{22}$) 0.5–99.5 mol % of an amino-$C_2$–$C_{12}$-alkanol or an amino-$C_5$–$C_{10}$-cycloalkanol, and
$a_{23}$) 0–50 mol % of a diamino-$C_1$–$C_8$-alkane,
$a_{24}$) 0–50 mol % of a 2,2'-bisoxazoline of the formula

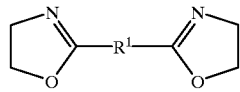

(I)

where $R^1$ is a single bond, a $(CH_2)_q$ alkylene group with q=2, 3 or 4, or a phenylene group,
where the total of the individual mole percentages is 100 mol %, where the molar ratio of $a_1$) to $a_2$) is from 0.4:1 to 1.5:1, with $a_3$) from 0 to 5 mol %, based on component $a_1$), of at least one compound D having three to six hydroxyl groups or carboxyl groups or mixtures thereof, or anhydrides or dianhydride of the carboxyl groups.

2. A biodegradable polyesteramide P2 having a molecular weight ($M_n$) of from 4000 to 40,000 g/mol, a viscosity number of from 30 to 450 g/ml (measured in o-dichlorobenzene/phenol (50/50 ratio by weight) at a concentration of 0.5% by weight of polyesteramide P2 at 25° C.) and a melting point of from 50 to 255° C. P2 being obtained by reacting a mixture consisting essentially of $b_1$)) a mixture consisting essentially of
35–95 mol % of adipic acid or ester-forming derivatives thereof or mixtures thereof,
5–65 mol % of terephthalic acid or ester-forming derivatives thereof or mixtures thereof, and
0–5 mol % of a compound containing sulfonate groups, where the total of the individual mole percentages is 100 mol %, and $b_2$) mixture $a_2$) consisting essentially of
$a_{21}$) 99.5–0.5 mol % of a dihydroxy compound selected from the group consisting of $C_2$–$C_6$-alkanediols and $C_5$–$C_{10}$-cycloalkanediols,
$a_{22}$) 0.5–99.5 mol % of an amino-C2–$C_{12}$-alkanol or an amino-$C_5$–$C_{10}$-cycloalkanol, and
$a_{23}$) 0–50 mol % of a diamino-$C_1$–$C_8$-alkane, $a_{24}$) 0–50 mol % of a 2,2'-bisoxazoline of the formula

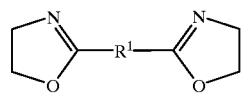

(I)

where $R^1$ is a single bond, a $(CH_2)_q$ alkylene group with q=2, 3 or 4, or a phenylene group,
where the total of the individual mole percentages is 100 mol %, where the molar ratio of $b_1$) to $b_2$) is from 0.4:1 to 1.5:1, with $b_3$) from 0.01 to 40% by weight, based on component $b_1$), of an amino carboxylic acid selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms, compounds of the formulae IIa and IIb

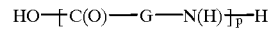

IIa

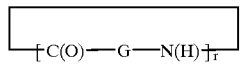

IIb where p is an integer from 1 to 1500 and r is an integer from 1 to 4, and G is a radical selected from the group consisting of phenylene, —$(CH_2)_n$—, where n is an integer from 1 to 12, —$C(R^2)H$— and —$C(R^2)HCH_2$— where $R^2$ is methyl or ethyl, and polyoxazolines with the repeating unit III

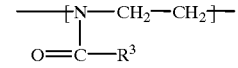

III where $R^3$ is hydrogen, $C_1$–$C_5$-alkyl, $C_5$–$C_8$-cycloalkyl, phenyl which is unsubstituted or substituted up to three times by $C_1$–$C_4$-alkyl groups, or tetrahydrofuryl, and $b_4$) from 0 to 5 mol %, based on component $b_1$), of at least one compound D having three to six hydroxyl groups or carboxyl groups or mixtures thereof, or anhydrides or dianhydrides of the carboxyl groups.

3. A biodegradable polyesteramide Q1 having a molecular weight ($M_n$) of from 5000 to 50,000 g/mol, a viscosity number of from 30 to 450 g/lm (measured in o-dichlorobenzene/phenol (50/50% by weight) at a concentration of 0.5% by weight of polyesteramide Q1 at 25° C.) and a melting point of from 50 to 255° C., Q1 being obtained by reacting a mixture consisting essentially of $c_1$) the polyesteramide P1 defined in claim 1,
$c_2$) 0.01–50% by weight, based on component $c_1$), of an amino carboxylic acid selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms, compounds of the formulae IIa and IIb

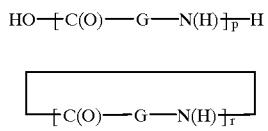

IIa

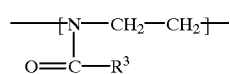

IIb where p is an integer from 1 to 1500 and r is an integer from 1 to 4, and G is a radical selected from the group consisting of phenylene, —$(CH_2)_n$—, where n is an integer from 1 to 12, —$C(R^2)H$— and —$C(R^2)HCH_2$ where $R^2$ is methyl or ethyl, and polyoxazolines with the repeating unit III $$\left[ \begin{array}{c} -N-CH_2-CH_2- \\ | \\ O=C-R^3 \end{array} \right]$$ III where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, and $c_3$) 0–5 mol %, based on component $a_1$), of at least one compound D having three to six hydroxyl groups or carboxyl groups or mixtures thereof, or anhydrides or dianhydrides of the carboxyl groups.

4. A biodegradable polyesteramide Q2 having a molecular weight ($M_n$) of from 5000 to 50,000 g/mol, a viscosity number of from 30 to 450 g/ml (measured in o-dichlorobenzene/phenol (50/50% by weight) at a concentration of 0.5% by weight of polyesteramide Q2 at 25° C.) and a melting point of from 50 to 220° C., Q2 being obtained by reacting a mixture consisting essentially of $d_1$) from 95 to 99.9% by weight of the polyesteramide P1 defined in claim 1, $d_2$) from 0.1 to 5% by weight of a diisocyanate, and $d_3$) from 0 to 5 mol %, based on component $a_1$), of at least one compound D having three to six hydroxyl groups or carboxyl groups or mixtures thereof, or anhydrides or dianhydrides of the carboxyl groups.

5. A biodegradable polymer T1 having a molecular weight ($M_n$) of from 6000 to 50,000 g/mol, with a viscosity number of from 30 to 450 g/ml (measured in o-dichlorobenzene/phenol (50/50 ratio by weight) at a concentration of 0.5% by weight of polymer T1 at 25° C.) and a melting point of from 50 to 255° C., T1 being obtained by reacting the polyesteramide Q1 defined in claim 3 with $e_1$) 0.1–5% by weight, based on the polyesteramide Q1, of diisocyanate, and $e_2$) 0–5 mol %, based on component $a_1$) of at least one compound D having three to six hydroxyl groups or carboxyl groups or mixtures thereof, or anhydrides or dianhydrides of the carboxyl groups.

6. A biodegradable polymer T2 having a molecular weight ($M_n$) of from 6000 to 50,000 g/mol, with a viscosity number of from 30 to 450 g/ml (measured in o-dichlorobenzene/phenol (50/50 ratio by weight) at a concentration of 0.55 by weight of polymer T2 at 25° C.) and a melting point of from 50 to 255° C., T2 being obtained by reacting the polyesteramide Q2 defined in claim 4 with $f_1$) 0.01–50% by weight, based on the polyesteramide Q2, of an amino carboxylic acid selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms, compounds of the formulae IIa and IIb

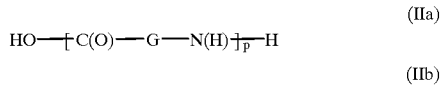

(IIa)

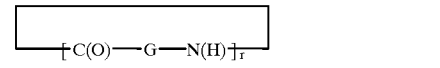

(IIb)

where p is an integer from 1 to 1500 and r is an integer from 1 to 4, and G is a radical selected from the group consisting of phenylene, —$(CH_2)_n$—, where n is an integer from 1 to 12, —$C(R^2)H$— and —$C(R^2)HCH_2$ where $R^2$ is methyl or ethyl, and polyoxazolines with the repeating unit III

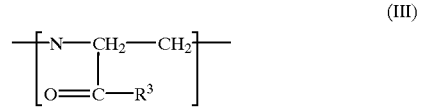

(III)

where $R^3$ is hydrogen, $C_1$–$C_6$-alkyl $C_5$–$C_8$-cycloalkyl, phenyl which is unsubstituted or substituted up to three times by $C_1$–$C_4$-alkyl groups, or tetrahydrofuryl, and $f_2$) 0–5 mol %, based on component $a_1$) of at least one compound D having three to six hydroxyl groups or carboxyl groups or mixtures thereof, or anhydrides or dianhydrides of the carboxyl groups.

7. A biodegradable polymer T3 having a molecular weight ($M_n$) of from 6000 to 50,000 g/mol, with a viscosity number of from 30 to 450 g/ml (measured in o-dichlorobenzene/phenol (50/50 ratio by weight) at a concentration of 0.5% by weight of polymer T3 at 25° C.) and a melting point of from 50 to 255° C., T3 being obtained by reacting $g_1$) a polyesteramide P2 having a molecular weight ($M_n$) of from 4000to 40,000 g/mol, a viscosity number of from 30 to 450 g/ml (measured in o-dichlorobenzene/phenol (50/50 ratio by weight) at a concentration of 0.5% by weight of polyesteramide P2 at 25° C.) and a melting point of from 50 to 255° C., P2 being obtained by reacting a mixture consisting essentially of $b_1$) a mixture consisting essentially of 35–95 mol % of adipic acid or ester-forming derivatives thereof or mixtures thereof, 5–65 mol % of terephthalic acid or ester-forming derivatives thereof or mixtures thereof, and 0–5 mol % of a compound containing sulfonate groups, where the total of the individual mole percentages is 100 mol %, and $b_2$) mixture $a_2$) consisting essentially of $a_{21}$) 99.5–0.5 ml of a dihydroxy compound selected from the groups consisting of $C_2$–$C_6$-alkanediols and $C_5$–$C_{10}$-cycloalkanol, $a_{22}$) 0.5–99.5 mol % of an amino-$C_2$–$C_{12}$alkanol or an amino-$C_5$–$C_{10}$-cycloalkanol, $a_{23}$) 0–50 mol % of a diamino-$C_1$–$C_8$-alkane, and $a_{24}$) 0–50 mol % of a 2,2'-bisoxazoline of the formula I

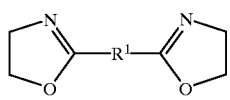
(I)

where $R^1$ is a single bond, a $(CH_2)_q$ alkylene group with g=2, 3 or 4, or a phenylene group, where the total of the individual mole percentages is 100 mol %, where the molar ratio of $b_1$) to $b_2$) is from 0.4:1 to 1.5:1, with $b_3$) from 0.01 to 40% by weight, based on component $b_1$), of an amino carboxylic acid selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms, compounds of the formulae IIa and IIb

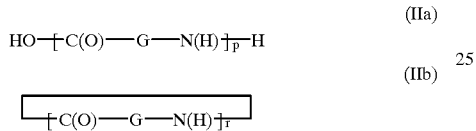
(IIa)
(IIb)

where p is an integer from 1 to 1500 and r is an integer from 1 to 4, and G is a radical selected from the group consisting of phenylene, —$(CH_2)_n$—, where n is an integer from 1 to 12, —$C(R^2)H$— and —$C(R^2)HCH_2$ where $R^2$ is methyl or ethyl, and polyoxazolines with the repeating unit III

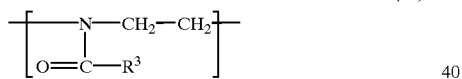
(III)

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, and $b_4$) from 0 to 5 mol % based on component $b_1$), of at least one compound D having three to six hydroxyl groups or carboxyl groups or mixtures thereof, or anhydrides or dianhydrides of the carboxyl groups, or $g_2$) a mixture consisting essentially of the polyesteramide P1 defined in claim 1, and 0.01–50% by weight, based on the polyesteramide P1, of the amino carboxylic acid, or $g_3$) a mixture consisting essentially of polyesteramides P1 which differ from one another in composition, with 0.1–5% by weight, based on the polyesteramides $g_1$) to $g_3$), of a diisocyanate, and 0–5 mol %, based on component $a_1$), of at least one compound D having three to six hydroxyl groups or carboxyl groups or mixtures thereof or anhydrides or dianhydrides of the carboxyl groups.

8. A biodegradable thermoplastic molding composition T4 obtained by mixing in a conventional way $h_1$) 99.5–0.5% by weight of a polymer selected from the group consisting of T3 as defined in claim 7, P1, P2 and Q2, Q2 having a molecular weight ($M_n$) of from 5000 to 50,000 g/mol, a viscosity number of from 30 to 450 g/ml (measured in o-dichlorobenzene/phenol (50/50% by weight) at a concentration of 0.5% by weight of polyesteramide Q2 at 25° C.) and a melting point of from 50 to 220° C., Q2 being obtained by reacting a mixture consisting essentially of $d_1$) from 95 to 99.9% by weight of the polyesteramide P1, $d_2$) from 0.1 to 5% by weight of a diisocyanate, and $d_3$) from 0 to 5 mol %, based on component $a_1$), of at least one compound D having three to six hydroxyl groups or carboxyl groups or mixtures thereof, or anhydrides or dianhydrides of the carboxyl groups, with $h_2$) 0.5–99.5% by weight of a hydroxy carboxylic acid H1 of the formula IVa or IVb

(IVa)
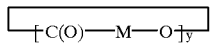
(IIb)

where x is an integer from 1 to 1500 and y is an integer from 1 to 4, and M is a radical which is selected from the group consisting of phenylene, —$(CH_2)_z$—, where z is an integer from 1 to 5, —$C(R^2)H$— and —$C(R^2)HCH_2$, where $R^2$ is methyl or ethyl.

9. A process for preparing the biodegradable polyesteramide P1 defined in claim 1, which comprises reacting a mixture consisting essentially of $a_1$) a mixture consisting essentially of
35–95 mol % of adipic acid or ester-forming derivatives thereof or mixtures thereof,
5–65 mol % of terephthalic acid or ester-forming derivatives thereof or mixtures thereof, and
0–5 mol % of a compound containing sulfonate groups, where the total of the individual mole percentages is 100 mol %, and $a_2$) a mixture consisting essentially of
$a_{21}$) 99.5–0.5 mol % of a dihydroxy compound selected from the group consisting of $C_2$–$C_6$-alkanediols and $C_5$–$C_{10}$-cycloalkanediols,
$a_{22}$) 0.5–99.5 mol % of an amino-$C_2$–$C_{12}$-alkanol or an amino-$C_5$–$C_{10}$-cycloalkanol, and
$a_{23}$) 0–50 mol of a diamino-$C_1$–$C_8$-alkane,
$a_{24}$) 0–50 mol % of a 2,2'-bisoxazoline of the formula I

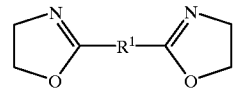
(I)

where $R^1$ is a single bond, a $(CH_2)_q$ alkylene group with q=2, 3 or 4, or a phenylene group, where the total of the individual mole percentages is 100 mol %, where the molar ratio of $a_1$) to $a_2$) is from 0.4:1 to 1.5:1, with $a_3$) from 0 to 5 mol %, based on component $a_1$), of the compound D.

10. A process for preparing the biodegradable polyesteramide P2 defined in claim 2, which comprises reacting a mixture consisting essentially of b₁) a mixture consisting essentially of
  20–95 mol % of adipic acid or ester-forming derivatives thereof or mixtures thereof,
  5–80 mol % of terephthalic acid or ester-forming derivatives thereof or mixtures thereof, and
  0–5 mol % of a compound containing sulfonate groups, where the total of the individual mole percentages is 100 mol %, and
b₂) mixture a₂) consisting essentially of
  a₂₁) 99.5–0.5 mol of a dihydroxy compound selected from the group consisting of $C_2$–$C_6$-alkanediols and $C_5$–$C_{10}$-cycloalkanediols,
  a₂₂) 0.5–99.5 mol % of an amino-$C_2$–$C_{12}$-alkanol or an amino-$C_5$–$C_{10}$-cycloalkanol, and
  a₂₃) 0–50 mol % of a diamino-$C_1$–$C_8$-alkane,
  a₂₄) 0–50 mol % of a 2,2'-bisoxazoline of the formula I

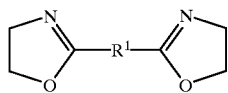

(I)

where $R^1$ is a single bond, a $(CH_2)_q$ alkylene group with q=2, 3 or 4, or a phenylene group,
where the total of the individual mole percentages is 100 mol %,
where the molar ratio of b₁) to b₂) is from 0.4:1 to 15:1, with
b₃) from 0.01 to 40% by weight, based on component b₁), of the amino carboxylic acid, and
b₄) from 0 to 5 mol %, based on component b₁), of the compound D.

11. A process for preparing the biodegradable polyesteramide Q1 defined in claim 3, which comprises the steps of
c₁) repairing the polyesteramide P1 by reacting a mixture consisting essentially of
  a₁) a mixture consisting essentially of
    35–95 mol % of adipic acid or ester-forming derivatives thereof or mixtures thereof,
    5–65 mol % of terephthalic acid or ester-forming derivatives thereof or mixtures thereof, and
    0–5 mol % of a compound containing sulfonate groups, where the total of the individual mole percentages is 100 mol %, and
  a₂) a mixture consisting essentially of
    a₂₁) 99.5–0.5 mol % of a dihydroxy compound selected from the group consisting of $C_2$–$C_6$-alkanediols and $C_5$–$C_{10}$-cycloalkanediols,
    a₂₂) 0,5–99.5 mol % of an amino-$C_2$–$C_{12}$-alkanol or an amino-$C_5$–$C_{10}$-cycloalkanol, and
    a₂₃) 0–50 mol % of a diamino-$C_1$–$C_8$-alkane,
    a₂₄) 0–50 mol % of a 2,2'-bisoxazoline of the formula I

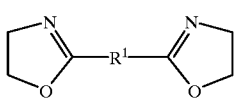

(I)

where $R^1$ is a single bond, a $(CH_2)_q$ alkylene group with q=2, 3 or 4, or a phenylene group, where the total of the individual mole percentages is 100 mol %, where the molar ratio of a₁) to a₂) is from 0.4:1 to 1.5:1, with
  a₃) from 0 to 5 mol %, based on component a₁), of the compound D,
and reacting a mixture consisting essentially of the polyesteramide P1 prepared in c₁) with
c₂) 0.01–50% by weight, based on component c₁), of an amino carboxylic acid selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms, compounds of the formulae IIa and IIb

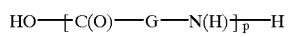

(IIa)

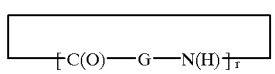

(IIb)

where p is an integer from 1 to 1500 and r is an integer from 1 to 4, and G is a radical selected from the group consisting of phenylene, —$(CH_2)_n$—, where n is an integer from 1 to 12, —$C(R^2)H$— and —$C(R^2)HCH_2$— where $R^2$ is methyl or ethyl, and polyoxazolines with the repeating unit III

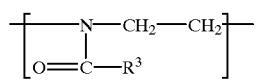

(III)

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, and C₃) 0–5 mol %, based on component a₁); of the compound D.

12. A process for preparing the biodegradable polyesteramide Q2 defined in claim 4, which comprises the steps of
d₁ preparing the polyesteramide P1, by reacting a mixture consisting essentially of
  a₁) a mixture consisting essentially of
    35–95 mol % of adipic acid or ester-forming derivatives thereof or mixtures thereof,
    5–65 mol % of terephthalic acid or ester-forming derivatives thereof or mixtures thereof, and
    0–5 mol % of a compound containing sulfonate groups, where the total of the individual mole percentages is 100 mol %, and
  a₂) a mixture consisting essentially of
    a₂₁) 99.5–0.5 mol % of a dihydroxy compound selected from the group consisting of $C_2$–$C_6$-alkanediols and $C_5$–$C_{10}$-cycloalkanediols,
    a₂₂) 0.5–99.5 mol % of an amino-$C_2$–$C_{12}$-alkanol or an amino-$C_5$–$C_{10}$-cycloalkanol, and
    a₂₃) 0–50 mol % of a diamino-$C_1$–$C_8$-alkane,
    a₂₄) 0–50 mol % of a 2,2'-bisoxazoline of the formula I

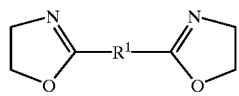 (I)

where $R^1$ is a single bond, a $(CH_2)_q$ alkylene group with q=2, 3 or 4, or a phenylene group,
where the total of the individual mole percentages is 100 mol %,
where the molar ratio of $a_1$) to $a_2$) is from 0.4:1 to 1.5:1, with
$a_3$) from 0 to 5 mol %, based on component $a_1$), of the compound D,
and reacting a mixture consisting essentially of from 95 to 99,9% by weight of the polyesteramide P1 prepared in $d_1$), with
$d_2$) from 0.1 to 5% by weight of a diisocyanate, and
$d_3$) from 0 to 5 mol %, based on component $a_1$) of the compound D.

13. A process for preparing the biodegradable polymers T1 defined in claim 5, which comprises the steps of
$c_1$) preparing the polyesteramide P1 by reacting a mixture consisting essentially of
$a_1$) a mixture consisting essentially of
35–95 mol % of adipic acid or ester-forming derivatives thereof or mixtures thereof,
5–65 mol % of terephthalic acid or ester-forming derivatives thereof or mixtures thereof, and
0–5 mol % of a compound containing sulfonate groups,
where the total of the individual mole percentages is 100 mol %, and
$a_2$) a mixture consisting essentially of
$a_{21}$) 99.5–0.5 mol % of a dihydroxy compound selected from the group consisting of $C_2$–$C_6$-alkanediols and $C_5$–$C_{10}$-cycloalkanediols,
$a_{22}$) 0.5–99.5 mol % of an amino-$C_2$–$C_{12}$-alkanol or an amino-$C_5$–$C_{10}$cycloalkanol, and
$a_{23}$) 0–50 mol % of a diamino-$C_1$–$C_8$-alkane,
$a_{24}$) 0–50 mol % of a 2,21-bisoxazoline of the formula I

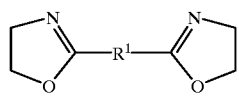 (I)

where $R^1$ is a single bond, a $(CH_2)_q$ alkylene group with q=2, 3 or 4, or a phenylene group,
where the total of the individual mole percentages is 100 mol %,
where the molar ratio of $a_1$) to $a_2$) is from 0.4:1 to 1.5:1, with
$a_3$) from 0 to 5 mol %, based on component $a_1$), of at least one compound D having three to six hydroxyl groups or carboxyl groups or mixtures thereof, or anhydrides or dianhydrides of the carboxyl groups, reacting the polyesteramide P1 prepared in $c_1$) with
$c_2$) 0.01–50% by weight, based on component $c_1$), of an amino carboxylic acid selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms, compounds of the formulae IIa and IIb

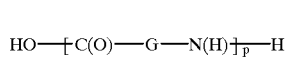 (IIa)

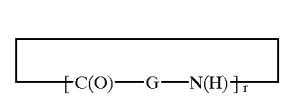 (IIb)

where p is an integer from 1 to 1500 and r is an integer from 1 to 4, and G is a radical selected from the group consisting of phenylene, —$(CH_2)_n$—, where n is an integer from 1 to 12, —$C(R^2)H$— and —$C(R^2)HCH_2$— where $R^2$ is methyl or ethyl, and polyoxazolines with the repeating unit III

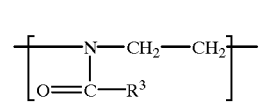 (III)

where $R^3$ is hydrogen, $C_1$–$C_6$-alkyl, $C_5$–$C_8$cycloalkyl, phenyl which is unsubstituted or substituted up to three times by $C_1$–$C_4$-alkyl groups, or tetrahydrofuryl, and
$c_3$) 0–5 mol %, based on component $a_1$) from the preparation of P1, of at least one compound D having three to six hydroxyl groups or carboxyl groups or mixtures thereof, or anhydrides or dianhydrides of the carboxyl groups, to form the polyesteramides Q1, and reacting Q1 with
$e_1$) 0.1–5% by weight, based on the polyesteramide Q1, of a diisocyanate, and
$e_2$) 0–5 mol %, based on component $a_1$), of the compound D.

14. A process for preparing the biodegradable polymers T2 defined in claim 6, which comprises the steps of
$d_1$) preparing the polyesteramide P1 by reacting a mixture consisting essentially of
$a_1$) a mixture consisting essentially of
35–95 mol % of adipic acid or ester-forming derivatives thereof or mixtures thereof,
5–65 mol % of terephthalic acid or ester-forming derivatives thereof or mixtures thereof, and
0–5 mol % of a compound containing sulfonate groups, where the total of the individual mole percentages is 100 mol %, and
$a_2$) a mixture consisting essentially of
$a_{21}$) 99.5–0.5 mol % of a dihydroxy compound selected from the group consisting of $C_2$–$C_6$-alkanediols and $C_5$–$C_{10}$-cycloalkanediols,
$a_{22}$) 0.5–99.5 mol % of an amino-$C_2$–$C_{12}$-alkanol or an amino-$C_5$–$C_{10}$-cycloalkanol, and
$a_{23}$) 0–50 mol % of a diamino-$C_1$–$C_8$-alkane,
$a_{24}$) 0–50 mol % of a 2,2'-bisoxazoline of the formula I

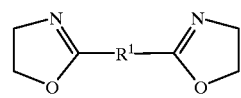 (I)

where $R^1$ is a single bond, a $(CH_2)_q$ alkylene group with q=2, 3 or 4, or a phenylene group, where the total of the individual mole percentages is 100 mol %,
where the molar ratio of $a_1$) to $a_2$) is from 0.4:1 to 1.5:1, with $a_3$) from 0 to 5 mol %, based on component $a_1$), of at least one compound D having three to six hydroxyl groups or carboxyl groups or mixtures thereof, or anhydrides or dianhydrides of the carboxyl groups, reacting from 95 to 99.9% by weight of polyesteramide P1 prepared in $d_1$) with $d_2$) from 0.1 to 5% by weight of a diisocyanate, and $d_3$) from 0 to 5 mol %, based on component $a_1$), of the compound D, to form the polyesteramide Q2, and reacting Q2 with $f_1$) 0.01–50% by weight, based on the polyesteramide Q2, of an amino carboxylic acid selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms, compounds of the formulae IIa and IIb

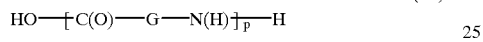

(IIa)

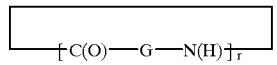

(IIb)

where p is an integer from 1 to 1500 and r is an integer from 1 to 4, and G is a radical selected from the group consisting of phenylene, —(CH$_2$)$_n$—, where n is an integer from 1 to 12, —C(R$^2$)H— and —C(R$^2$)HCH$_2$ where R$^2$ is methyl or ethyl, and polyoxazolines with the repeating unit III

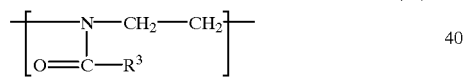

(III)

where R$^3$ is hydrogen, C$_1$–C$_6$-alkyl, C$_5$–C$_8$-cycloalkyl, phenyl which is unsubstituted or substituted up to three times by C$_1$–C$_4$-alkyl groups, or tetrahydrofuryl, and $f_2$) 0–5 mol %, based on component $a_1$), of the compound D.

15. A process for preparing the biodegradable polymers T3 defined in claim 4, which comprises the steps of $g_1$) preparing the polyesteramides P2 by reacting a mixture consisting essentially of $b_1$) a mixture consisting essentially of 35–95 mol % of adipic acid or ester-forming derivatives thereof or mixtures thereof, 5–65 mol % of terephthalic acid or ester-forming derivatives thereof or mixtures thereof, and 0–5 mol % of a compound containing sulfonate groups, where the total of the individual mole percentages is 100 mol %, $b_2$) mixture $a_2$) consisting essentially of $a_{21}$) 99.5–0.5 mol % of a dihydroxy compound selected from the group consisting of C$_2$–C$_6$-alkanediols and C$_5$–C$_{10}$-cycloalkanediols, $a_{22}$) 0.5–995 mol % of an amino-C$_2$–C$_{12}$-alkanol or an amino-C$_5$–C$_{10}$-cycloalkanol, and $a_{23}$) 0–50 mol % of a diamino-C$_1$–C$_8$-alkane, $a_{24}$) 0–50 mol % of a 2,2'-bisoxazoline of the formula I

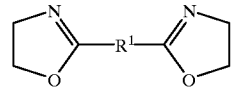

(I)

where R$^1$ is a single bond, a (CH$_2$)$_q$ alkylene group with q=2, 3 or 4, or a phenylene group, where the total of the individual mole percentages is 100 mol %, where the molar ratio of $b_1$) to $b_2$) is from 04:1 to 1.5:1, with $b_3$) from 0.01 to 40% by weight, based on component $b_1$), of an amino carboxylic acid selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms, compounds of the formulae IIa and IIb

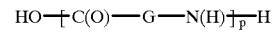

(IIa)

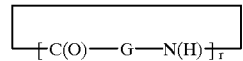

(IIb)

where p is an integer from 1 to 1500 and r is an integer from 1 to 4, and G is a radical selected from the group consisting of phenylene, —(CH$_2$)$_n$—, where n is an integer from 1 to 12, —C(R$^2$)H— and —C(R$^2$)HCH$_2$ where R$^2$ is methyl or ethyl, and polyoxazolines with the repeating unit III

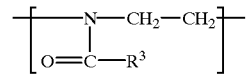

(III)

where R$^3$ is hydrogen, C$_1$–C$_6$-alkyl, C$_5$–C$_8$-cycloalkyl, phenyl which is unsubstituted or substituted up to three times by C$_1$–C$_4$-alkyl groups, or tetrahydrofuryl, and $b_4$) from 0 to 5 mol %, based on component $b_1$), of at least one compound D having three to six hydroxyl groups or carboxyl groups or mixtures thereof, or anhydrides or dianhydrides of the carboxyl groups, $g_2$) preparing a mixture consisting essentially of polyesteramide P1 and from 0.01–50% weight, based on the polyesteramide P1 of the amino carboxylic acid, P1 being prepared by reacting a mixture consisting essentially of $a_1$) a mixture consisting essentially of 35–95 mol % of adipic acid or ester-forming derivatives thereof or mixtures thereof, 5–65 mol % of terephthalic acid or ester-forming derivatives thereof or mixtures thereof, and 0–5 mol % of a compound containing sulfonate groups, where the total of the individual mole percentages is 100 mol %, and a mixture $a_2$), where the molar ratio of $a_1$) to $a_2$) is from 0.4:1 to 1.5:1, with a₃) from 0 to 5 mol %, based on component a₁), of the compound D, o g₃) preparing a mixture consisting essentially of polyesteramides P1 which differ from one another in composition, and reacting g₁) or g₂) or g₃) with 0.1–5% by weight, based on the polyesteramides g₁) to g₃) of a diisocyanate, and 0–5 mol %, based on component a₁), of the compound D.

16. A process for preparing the biodegradable thermoplastic molding compositions T4 defined in claim 8, which comprises the steps of
preparing a polymer selected from the group consisting of P1, P2, Q2 and T3, and reacting
99.5–0.5% by weight of P1, P2, Q2 or T3 with
0.5–99.5% by weight of the hydroxy carboxylic acid H1.

17. A compostable molding made from a biodegradable polyesteramide P1 as claimed in claim 1.

18. An adhesive comprising a biodegradable polyesteramide P1 as claimed in claim 1.

19. A biodegradable blend made from a biodegradable polyesteramide P1 as claimed in claim 2.

20. A biodegradable foam made from a biodegradable polyesteramide P1 as claimed in claim 1.

21. A paper coating material made from a biodegradable polyesteramide P1 as claimed in claim 1.

22. A coating made from the biodegradable polyesteramide P1 defined in claim 1, for the coating of substrates.

23. The polyesteramide P1 defined in claim 1, which comprises at least 0.01 mol %, based on a₁), of the compound D.

24. The polyesteramide P1 defined in claim 23, wherein the compound D is selected from the group consisting of tartaric acid, citric acid, malic acid, trimethylolpropane, trimethylolethane, pentaerythritol, polyethertriols, glycerol, trimesic acid, trimellitic acid, trimellitic anhydride, pyromellitic acid, pyromellitic anhydride and hydroxyisophthalic acid.

25. The polyesteramide P1 defined in claim 24, wherein the compound D is glycerol.

26. The polyesteramide P1 defined in claim 24, wherein the compound D is pyromellitic acid or pyromellitic dianhydride.

27. The polyesteramide P1 defined in claim 1, which comprises at least 0.5 mol % of the 2,2'-bisoxazoline of the formula I.

28. The polyesteramide P1 defined in claim 1, which is obtained by reacting the components a₁), a₂) and a₃) in the presence of phosphonous acid or phosphorous acid.

29. The polyesteramide P1 defined in claim 1, which is obtained by initially reacting a part of the component a₁) and a part of the component a₂) to form a prepolymer, and subsequently reacting the prepolymer with the residual part of the component a₁), the residual part of the component a₂) and with the component a₃).

30. The polyesteramide P2 defined in claim 2, which comprises at least 0.01 mol %, based on b₁), of the compound D.

31. The polyesteramide P2 defined in claim 30, wherein the compound D is selected from the group consisting of tartaric acid, citric acid, malic acid, trimethylolpropane, trimethylolethane, pentaerythritol, polyethertriols, glycerol, trimesic acid, trimellitic acid, trimellitic anhydride, pyromellitic acid, pyromellitic anhydride and hydroxyisophthalic acid.

32. The polyesteramide P2 defined in claim 31, wherein the compound D is glycerol.

33. The polyesteramide P2 defined in claim 31, wherein the compound D is pyromellitic acid or pyromellitic dianhydride.

34. The polyesteramide P2 defined in claim 2, which comprises at least 0.5 mol %, based on b₂), of the 2,2'-bisoxazoline.

35. The polyesteramide P2 defined in claim 2, which comprises the 2,2'-bisoxazoline of the formula I wherein R1 is phenylene.

36. The polyesteramide Q2 defined in claim 4, wherein the polyesteramide P1 comprises at least 0.01 mol %, based on a₁), of the compound D.

37. The polyesteramide Q2 defined in claim 36, wherein the compound D is selected from the group consisting of tartaric acid, citric acid, malic acid, trimethylolpropane, trimethylolethane, pentaerythritol polyethertriols, glycerol, trimesic acid, trimellitic acid, trimellitic anhydride, pyromellitic acid, pyromellitic anhydride and hydroxyisophthalic acid.

38. The polyesteramide Q2 defined in claim 37, wherein the compound D is glycerol.

39. The polyesteramide Q2 defined in claim 37, wherein the compound D is pyromellitic acid or pyromellitic dianhydride.

40. The polyesteramide Q2 defined in claim 4, wherein the isocyanate is selected from the group consisting of tolylene 2,4-diisocyanate, tolylene 2,6-diisocyanate, 2,4'-diphenylmethane diisocyanate, 4,4'-diphenylmethane diisocyanate, naphthylene-1,5-diisocyanate, xylylene diisocyanate, hexamethylene diisocyanate, isophorone diisocyanate and methylenebis(4-isocyanatocyclohexane).

41. The polyesteramides Q2 defined in claim 4, wherein the isocyanate is hexamethylene diisocyanate.

42. The polyesteramide Q2 defined in claim 4, wherein P1 is obtained by reacting the components a₁), a₂) and a₃) in the presence of phosphonous acid or phosphorous acid.

43. The polyesteramide Q2 defined in claim 4, wherein P1 is obtained by initially reacting a part of the component a₁) and a part of the component a₂) to form a prepolymer, and subsequently reacting the prepolymer with the residual part of the component a₁), the residual part of the component a₂) and with the component a₃).

44. A compostable molding made from the biodegradable polyesteramide Q2 defined in claim 4.

45. An adhesive made from the biodegradable polyesteramide Q2 defined in claim 4.

46. A biodegradable blend made from the biodegradable polyesteramide Q2 defined in claim 4.

47. A biodegradable foam made from the biodegradable polyesteramide Q2 defined in claim 4.

48. A coating made from the biodegradable polyesteramide Q2 defined in claim 4 for the coating of substrates.

49. A paper coating material made from the biodegradable polyesteramide Q2 defined in claim 4.

50. A sheet made from the biodegradable polyesteramide Q2 defined in claim 4.

51. The polymer T3 defined in claim 7, wherein the component P2 comprises at least 0.01 mol %, based on b₁), of the compound D.

52. The polymer T3 defined in claim 51, wherein the component P2 comprises a compound D selected from the group consisting of tartaric acid, citric acid, malic acid, trimethylolpropane, trimethylolethane, pentaerythritol, polyethertriols, glycerol, trimesic acid, trimellitic acid, trimellitic anhydride, pyromellitic acid, pyromellitic anhydride and hydroxyisophthalic acid.

53. The polymer T3 defined in claim 52, wherein the compound D is glycerol.

54. The polymer T3 defined in claim 52, wherein the compound D is pyromellitic acid or pyromellitic dianhydride.

55. The polymer T3 defined in claim 7, wherein the component P2 comprises at least 0.5 mol %, based on $b_2$), of the 2,2'-bisoxazoline.

56. The polymer T3 defined in claim 7, wherein the component P2 comprises the 2,2'-bisoxazoline of the formula I wherein $R^1$ is phenylene.

57. The polymer T3 defined in claim 7, wherein the polyesteramide P2 comprises at least 0.01 mol %, based on $b_1$), of the compound D.

58. The polymer T3 defined in claim 7, wherein the isocyanate is selected from the group consisting of tolylene 2,4-diisocyanate, tolylene 2,6-diisocyanate, 2,4'-diphenylmethane diisocyanate, 4,4'-diphenylmethane diisocyanate, naphthylene-1,5-diisocyanate, xylylene diisocyanate, hexamethylene diisocyanate, isophorone diisocyanate and methylenebis(4-isocyanatocyclohexane).

59. The polymer T3 defined in claim 7, wherein the isocyanate is hexamethylene diisocyanate.

60. The molding composition T4 defined in claim 8, wherein the polyesteramide P1 comprises at least 0.01 mol %, based on $a_1$), of the compound D.

61. The molding composition T4 defined in claim 60, wherein the compound D is selected from the group consisting of tartaric acid, citric acid, malic acid, trimethylolpropane, trimethylolethane, pentaerythritol, polyethertriols, glycerol, trimesic acid, trimellitic acid, trimellitic anhydride, pyromellitic acid, pyromellitic anhydride and hydroxyisophthalic acid.

* * * * *

UNITED STATES PATENT AND TRADEMARK OFFICE
CERTIFICATE OF CORRECTION

PATENT NO. : 6,353,084 B1
DATED : March 5, 2002
INVENTOR(S) : Warzelhan et al.

It is certified that error appears in the above-identified patent and that said Letters Patent is hereby corrected as shown below:

Column 19,
Line 2, "dichlorobgnzene" should be -- dichlorobenzene --.
Line 65, "amino-C2-$C_{12}$-alkanol" should be -- amino-$C_2$-$C_{12}$-alkanol --.

Column 20,
Line 46, "$C_{/}$-$C_4$-alkyl" should be -- $C_1$-$C_4$-alkyl --.
Line 55, "g/lm" should be -- g/ml --.

Column 22,
Line 42, "4000to" should be -- 4000 to --.

Column 23,
Line 9, "g=2" should be -- q=2 --.

Column 24,
Line 47, "0-50 mol of" should be -- 0-50 mol% of --.

Column 25,
Line 10, "0.5 mol of" should be -- 0.5 mol% of --.
Line 52, "0,5" should be -- 0.5 --.

Column 26,
Line 42, "$C_3$" should be -- $c_3$ --; ");" should be -- ; --.
Line 47, "$d_1$" should be -- $d_1$) --.

Column 27,
Line 18, "99,9%" should be -- 99.9% --.

Column 28,
Line 27, "$C_3$)" should be -- $c_3$) --.

Column 29,
Line 50, "claim 4" should be -- claim 7 --.

Column 30,
Line 15, "04:1" should be -- 0.4:1 --.
Line 55, P1of" should be -- P1 of --.

UNITED STATES PATENT AND TRADEMARK OFFICE
CERTIFICATE OF CORRECTION

PATENT NO. : 6,353,084 B1
DATED : March 5, 2002
INVENTOR(S) : Warzelhan et al.

It is certified that error appears in the above-identified patent and that said Letters Patent is hereby corrected as shown below:

Column 31,
Line 2, "D o" should be -- D or --.

Column 32,
Line 8, "R1" should be -- $R^1$ --.

Signed and Sealed this

Third Day of September, 2002

*Attest:*

*Attesting Officer*

JAMES E. ROGAN
*Director of the United States Patent and Trademark Office*